United States Patent
Yamagishi

[11] Patent Number: 6,157,773
[45] Date of Patent: Dec. 5, 2000

[54] INFORMATION RECORDING APPARATUS

[75] Inventor: Yoichi Yamagishi, Tokyo, Japan

[73] Assignee: Canon Kabushiki Kaisha, Tokyo, Japan

[21] Appl. No.: 09/154,761

[22] Filed: Sep. 17, 1998

Related U.S. Application Data

[62] Division of application No. 08/315,677, Sep. 30, 1994, Pat. No. 5,857,059, which is a continuation of application No. 07/966,714, Oct. 26, 1992, abandoned.

[30] Foreign Application Priority Data

Oct. 31, 1991 [JP] Japan ..................................... 3-286434
Oct. 4, 1992 [JP] Japan ..................................... 4-091038

[51] Int. Cl.$^7$ .............................. H04N 5/78; H04N 5/917
[52] U.S. Cl. ......................... 386/109; 386/125; 386/112
[58] Field of Search ................................... 386/125, 126, 386/109, 111, 112, 46, 107, 117, 96, 27, 33, 1, 15, 36, 38, 39; H04N 5/78, 5/917

[56] References Cited

U.S. PATENT DOCUMENTS 5,067,029 11/1991 Takahashi ................................ 386/107

Primary Examiner—Robert Chevalier
Attorney, Agent, or Firm—Robin, Blecker & Daley

[57] ABSTRACT

There is provided an information recording apparatus which comprises an inputting part for inputting an information signal, a compressing part for compressing the information signal inputted by the inputting part, a connecting part for permitting connection of one of a plurality of recording media having different recording forms, an identifying part for identifying the recording form of a recording medium connected to the connecting part, and a controlling part for controlling a processing operation-of the compressing part in accordance with an output from the identifying part. There is also provided an information recording apparatus which comprises an inputting part for inputting an information signal, a compressing part for compressing the information signal inputted by the inputting part, a connecting part for permitting connection of a plurality of recording media having different recording forms, a setting part for setting a processing operation of the compressing part, and a recording part for selecting a recording medium on which the information signal is to be recorded from among the plurality of recording media connected to the connecting part, in accordance with an output from the setting part, and recording the information signal on the selected recording medium.

23 Claims, 28 Drawing Sheets

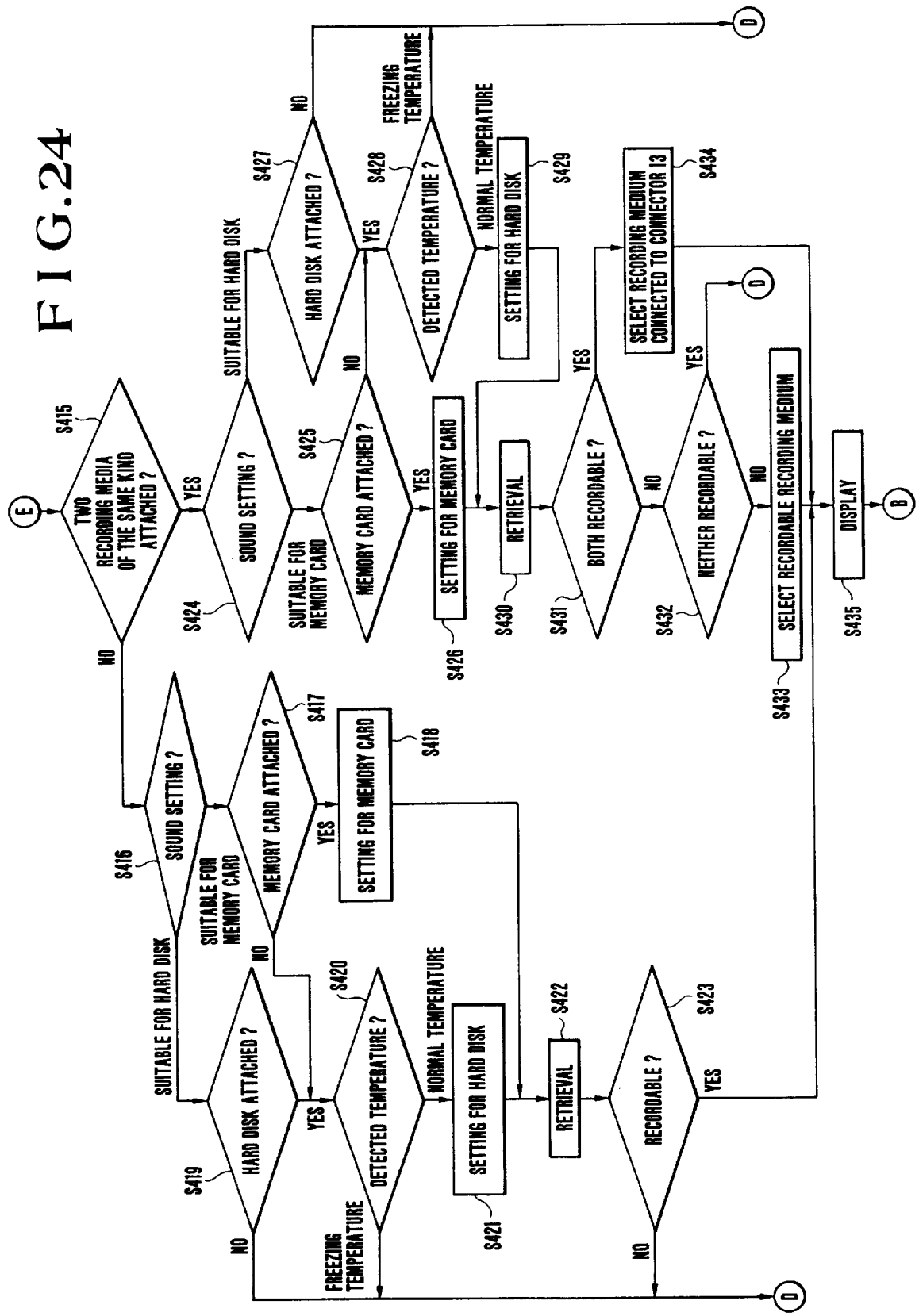

INFORMATION RECORDING APPARATUS

CROSS-REFERENCE TO RELATED APPLICATIONS

This application is a divisional of application Ser. No. 08/315,677, filed Sep. 30, 1994 now U.S. Pat. No. 5,857,059 and, which is a continuation of application Ser. No. 07/966,714, filed Oct. 26, 1992, now abandoned.

BACKGROUND OF THE INVENTION

1. Field of the Invention

The present invention relates to an information recording apparatus and, more particularly, to an information recording apparatus to which a plurality of recording media having different recording forms can be attached and which is arranged to record image information on such recording media.

2. Description of the Related Art

An electronic still camera which is one example of an information recording apparatus will be referred to hereinafter for the purpose of illustration.

An apparatus which is arranged to record a still image and a sound on a magnetic disk which serves as a recording medium has heretofore been commercially available as a conventional type of electronic still camera. In addition, an electronic still camera has already been proposed which employs as a recording medium a memory card having a solid-state memory device such as a DRAM, an SRAM or an EEPROM.

However, the recording capacity of such a memory card is limited because of a limited degree of integration of a memory device or limits of the number of memory elements which can be incorporated into a single memory card. In addition, since the memory card is more expensive than other recording media at present, it is economically difficult to utilize the memory card as a large-capacity recording medium.

If a large-capacity magnetic recording medium such as a hard disk unit is used in place of the memory card, it is possible to achieve large-capacity recording comparatively inexpensively.

However, if the hard disk unit is used as a recording medium for the electronic still camera, large-capacity recording can be inexpensively achieved, but a number of problems will be encountered, for example, a limited recording speed, susceptibility to vibration or shock, susceptibility to environmental conditions such as temperature (particularly, a freezing temperature), and a large power consumption.

If the memory card is used as a recording medium for the electronic still camera, there will be various advantages such as an increased recording speed, insusceptibility to vibration or shock, insusceptibility to environmental conditions such as temperature, and a small power consumption. In contrast, a number of disadvantages will be encountered, for example, expensiveness and unsuitability for large-capacity recording. Particularly if a sound as well as an image is recorded, the maximum number of photographed images recordable in the memory card is limited to a further extent since the memory card can only record a limited number of photographed images even if only images are recorded.

SUMMARY OF THE INVENTION

A primary object of the present invention which has been made to solve the above-described problems is to provide an information recording apparatus capable of executing recording on a recording medium attached to the information recording apparatus, in a recording form optimum for the recording medium.

To achieve the above-described object, according to one aspect of the present invention, there is provided an information recording apparatus which comprises inputting means for inputting image information, recording means for recording the image information inputted by the inputting means on a recording medium, vibration detecting means for detecting a vibration of the recording means, and controlling means for controlling an operation for recording the image information on the recording means, in accordance with an output from the vibration detecting means.

According to another aspect of the present invention, there is provided an information recording apparatus which comprises inputting means for inputting an information signal, recording means for recording the information signal inputted by the inputting means on a recording medium, temperature detecting means for detecting a temperature of the recording medium, and controlling means for controlling an operation for recording the information signal on the recording medium, in accordance with an output from the temperature detecting means.

According to another aspect of the present invention, there is provided an information recording apparatus which comprises inputting means for inputting an information signal, compressing means for compressing the information signal inputted by the inputting means, connecting means for permitting connection of one of a plurality of recording media having different recording forms, identifying means for identifying the recording form of a recording medium connected to the connecting means, and controlling means for controlling a processing operation of the compressing means in accordance with an output from the identifying means.

Other objects and advantages of the present invention will become apparent from the following detailed description taken in conjunction with the accompanying drawings.

BRIEF DESCRIPTION OF THE DRAWINGS

FIG. 24 is a partial flowchart of the main routine according to the seventh embodiment;

DETAILED DESCRIPTION OF THE PREFERRED EMBODIMENTS

A first embodiment of the present invention will be described below with reference to FIG. 1.

Figure 1:
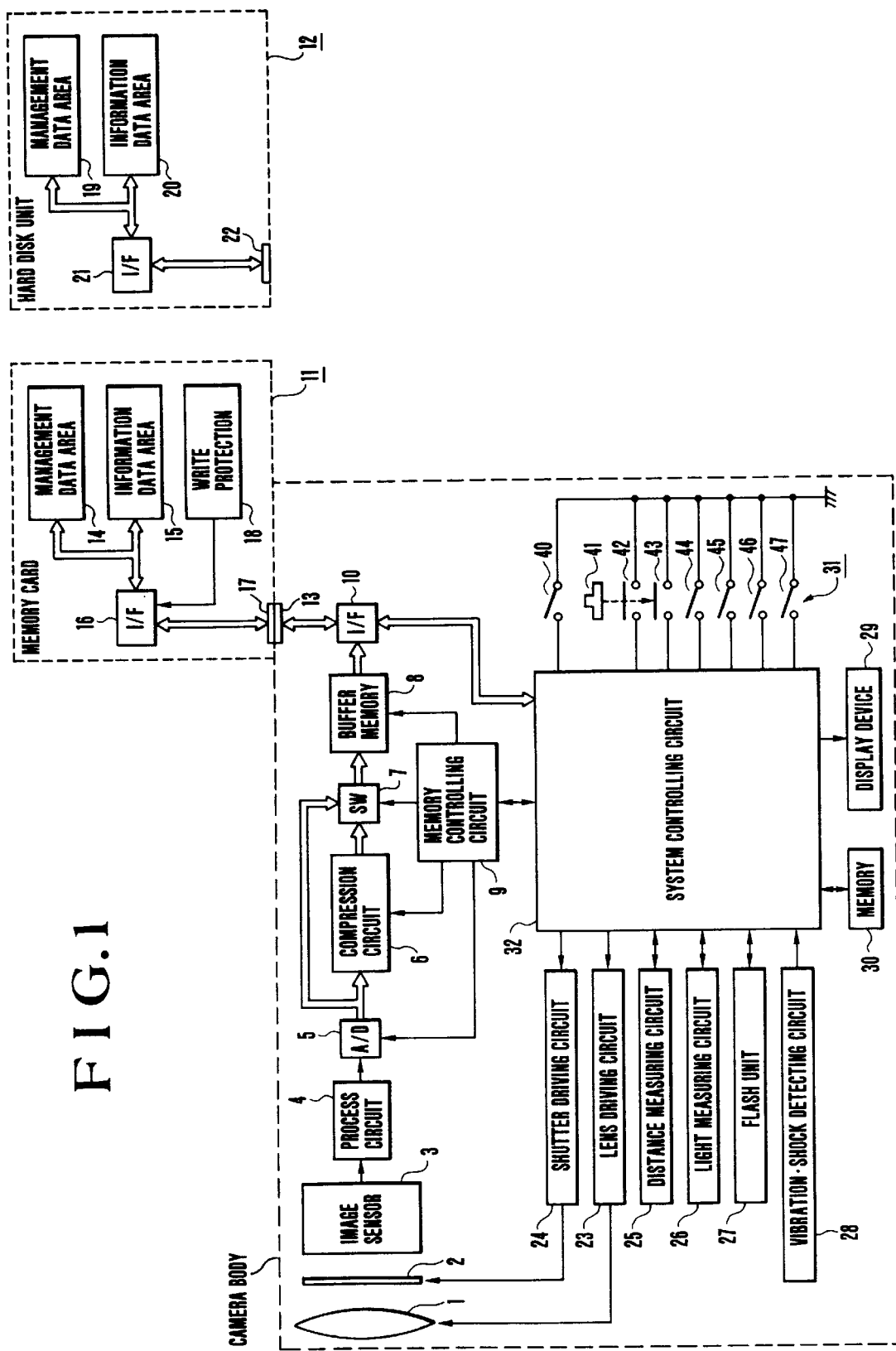
FIG. 1 is a block diagram of an electronic still camera according to a first embodiment of the present invention.

FIG. 1 is a block diagram of an electronic still camera according to the first embodiment of the present invention.

The electronic still camera shown in FIG. 1 includes a photographic lens unit 1, a shutter 2 provided with a diaphragm function, an image sensor 3 for converting an optical image into an electrical signal by means of a CCD or the like, a process circuit 4 for performing known camera-signal processing such as gamma correction, an A/D converter 5 for converting an analog output from the process circuit 4 into a digital signal, an image compression circuit 6 for performing compression of image data by means of adaptive discrete cosine transform (ADCT) or the like, and a selecting switch 7 for performing switching between the transfer of image data compressed by the image compression circuit 6 and that of image data (noncompressed) which has bypassed the image compression circuit 6.

The shown electronic still camera also includes a buffer memory 8 for temporarily storing a video signal, and the stored video signal can be read from the buffer memory B at a desired rate under control of a memory controlling circuit 9 which will be described later.

The memory controlling circuit 9 is provided for controlling the A/D converter 5, the image compression circuit 6 and the buffer memory 8. During compression, the compressed image data outputted from the image compression circuit 6 is written into the buffer memory 8, while, during noncompression, the image data outputted from the A/D converter 5 is written into the same, under control of the memory controlling circuit 9.

The shown electronic still camera also includes an interface (I/F) 10 for providing connection between the internal circuit of the electronic still camera and a memory card 11 or a hard disk unit 12, and a connector 13 disposed on the camera body for providing electrical connection between the camera body and the memory card 11 or the hard disk unit 12.

The memory card 11 has a recording area formed by a management data area 14 and an information data area 15, and information stored in the memory card 11 is read out to the outside through an interface 16 and a connector 17 which are secured to the memory card 11. Information for a write protection (write inhibition) 18 is also written thereinto from the outside through the interface 16 and the connector 17. The interface 16 includes constituent elements, such as a control circuit such as a CPU or an MPU, a nonvolatile memory such as a RON or an EEPROM, and a RAM, and executes control of the memory card 11 on the basis of a predetermined program.

The hard disk unit 12 has a memory area formed by a management data area 19 and an information data area 20, and information stored in the memory area is read out to the outside through an interface 21 and a connector 22. The interface 21 includes constituent elements, such as a control circuit such as a CPU or an MPU, a nonvolatile memory such as a ROM or an EEPROM, and a RAM, and executes control of the hard disk unit 12 on the basis of a predetermined program.

The shown electronic still camera also includes a lens driving circuit 23 for driving a focusing lens provided in the photographic lens unit 1, a shutter driving circuit 24 for driving the shutter 2, a distance measuring circuit 25 for measuring the distance to a subject, a light measuring circuit 26 for measuring the luminance of the subject, a flash unit 27, and a vibration-shock detecting circuit 28 for detecting a vibration or a shock imposed on the camera body.

More specifically, the vibration-shock detecting circuit 28 serves to detect the vibration of a recording medium attached to the camera body.

The shown electronic still camera includes a display device 29 for displaying the operational state of the electronic still camera (for example, the number of exposed frames), and a controlling memory 30 for storing constants, variables and the like relative to a photographic operation, which are used by a system controlling circuit 32.

The shown electronic still camera includes a switch group 31 which is operated to input various operational instructions into the system controlling circuit 32. The switch group 31 includes, for example, a main switch 40, a distance-light measuring switch 42 arranged to be closed by a first stroke of a release button 41 to specify execution of a distance measurement by the distance measuring circuit 25 and execution of a light measurement by the light measuring circuit 26, a recording switch 43 arranged to be closed by a second stroke of the release button 41 to specify execution of recording of a photographed image on the memory card 11 or the hard disk unit 12, a mode switch 44 for selecting a desired photographic mode from among a single-shooting (S) mode for executing one or one set of photographic cycles, a continuous-shooting (C) mode for continuously executing a plurality of or plural sets of photographic cycles, and a self-timer photography mode, and an image mode switch 45 for selecting a desired image recording format such as the number of images to be recorded, frame recording/field recording, an aspect ratio, the arrangement of pixels, a compression method and a compression ratio (although each of the switches 44 and 45 is shown as a single switch in FIG. 1, each of them is actually made up of a plurality of switch elements). The switch group 31 also includes an erase mode switch 46 for selecting an erase mode and an erase switch 47 for specifying execution of erasure.

The system controlling circuit 32, which will be described later in detail, provides control over the entire electronic still camera in accordance with an instruction supplied from the switch group 31, detection information obtained from detection of the kind of recording medium removably attached to the camera body and detection of the state (remaining storing capacity) of the recording medium, and detection information provided by various other detecting devices provided in the aforesaid camera body. For example, the system controlling circuit 32 causes the lens driving circuit 23 to drive the focusing lens of the photographic lens unit 1 on the basis of a measurement result provided by the distance measuring circuit 25, thereby controlling the photographic lens unit 1 so that it can move to an in-focus position. In addition, the system controlling circuit 32 causes the shutter driving circuit 24 to determine the open time of the shutter 2 so that an optimum amount of exposure can be obtained, on the basis of a measurement result provided by the light measuring circuit 26.

Figure 2:
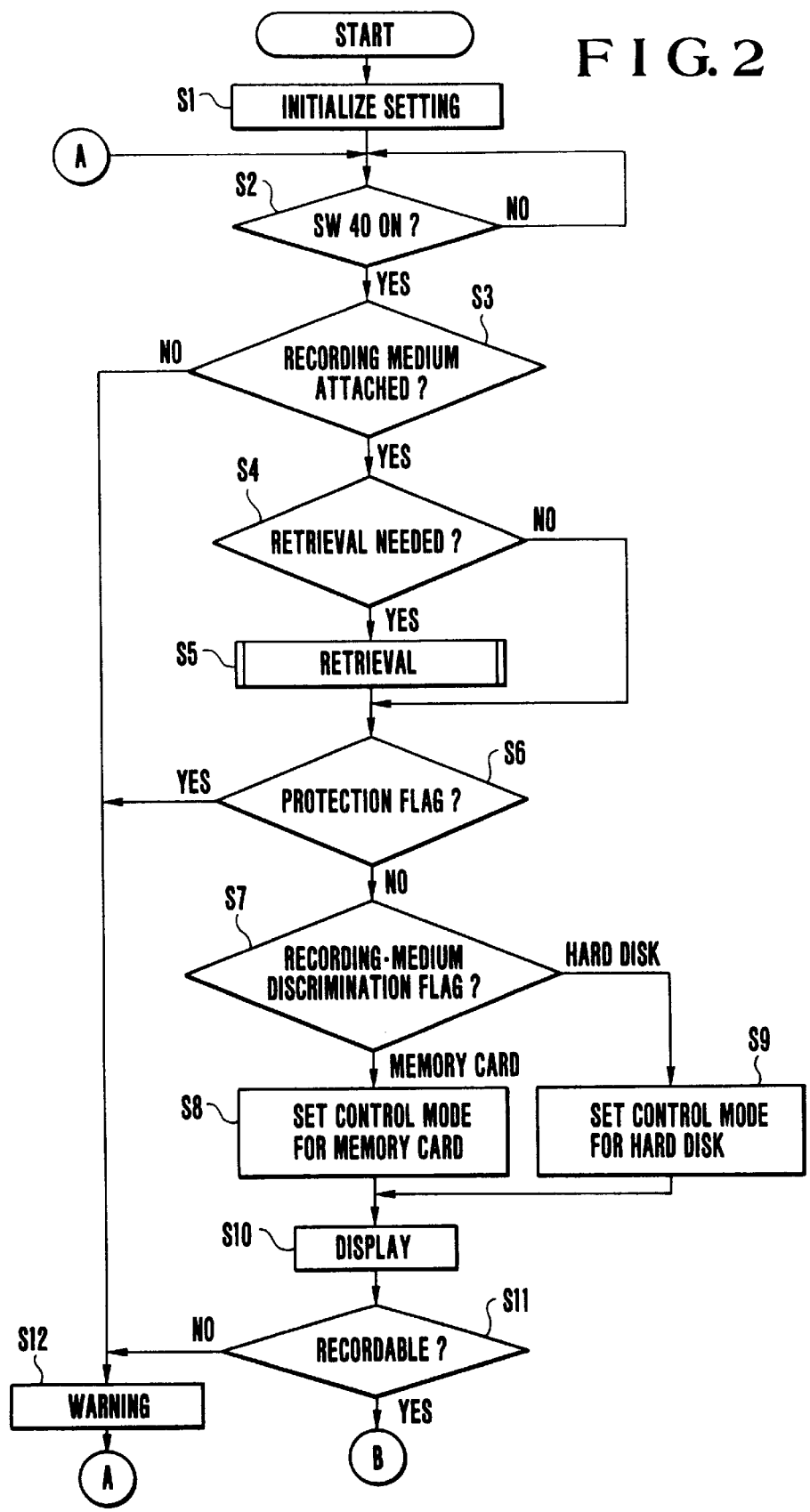
FIG. 2 is a partial flowchart of a main routine according to the first embodiment.

Operational control provided over the electronic still camera which is arranged in the above-described manner will be described in detail with reference to FIGS. 1 through 3.

When a power supply (not shown) is turned on, the system controlling circuit 32 initializes flags, control variables and so on (Step S1). When the main switch 40 is closed (Step S2), it is determined whether a recording medium (the memory card 11 or the hard disk unit 12 in the first embodiment) is attached to the camera body (Step S3).

If it is determined that the recording medium is not connected to the connector 13 of the camera body (Step S3), either a visual display (warning) indicating that no recording medium is connected to the connector 13 or a visual display (warning) indicating a request to connect the recording medium to the connector 13 is provided (Step S12). Then, the flow returns to Step S2.

If it is determined that the recording medium is connected to the connector 13 of the camera body (Step S3), and further if it is determined that no management data about the recording medium has yet been read (Step S4), retrieval of the management data about the recording medium connected to the connector 13 is performed (Step S5). Such retrieval will be described in detail later.

If it is determined that such management data has been read and the retrieval (or Step S5) is not needed, the flow passes Step S5.

If it is determined from the retrieval processing executed in Step S5 that the memory card 11 is connected as a recording medium, and if a protection flag is set which indicates that the set state of the write protection 18 has been detected (Step S6), a warning is displayed which indicates that writing to the connected recording medium is impossible (Step S12). Then, the flow returns to Step S2.

A decision is made as to a discrimination flag concerning the kind of the recording medium (indicating which of the memory card 11 and the hard disk unit 12 is attached), which flag is set by the retrieval processing of Step S5 (step S7). Settings associated with both an operating mode and a display mode are switched (Step S8 or S9) according to the result of the decision made in Step S7.

The processing of Step S8 or S9 is performed as follows. For example, if the memory card 11 is attached, a frame speed for the continuous-shooting mode is made faster than when the hard disk unit 12 is attached. In addition, if the memory card 11 is attached, the frame speed for the continuous-shooting mode is maintained until the end of the recordable area is reached. However, if the hard disk unit 12 is attached, the frame speed for the continuous-shooting mode is only maintained until the maximum number of exposures recordable in the buffer memory 8 is reached, or a continuous shooting is stopped when the maximum number of exposures recordable in the buffer memory 8 is reached. Thus, it is possible to automatically execute continuous shooting according to an access time peculiar to each kind of recording medium.

In addition, if the hard disk unit 12 is attached, the compression ratio of the image compression circuit 6 is made lower than when the memory card 11 is attached. Otherwise, if the hard disk unit 12 is attached, a compression operation is stopped. Thus, if the memory card 11 is attached, a photographic operation in which a higher priority is assigned to the number of recordable exposures can be automatically executed, whereas, if the hard disk unit 12 is attached, a photographic operation in which a higher priority is assigned to image quality can be automatically executed.

In addition, if the memory card 11 is attached, the number of remaining recordable exposures or the number of recorded exposures is numerically displayed. If the hard disk unit 12 is attached, the number of remaining recordable exposures or the number of recorded exposures is visually displayed in the form of the deformation of a graphics pattern or a variation in the number of bars since a numerical display is difficult for a photographer to understand because of the enormous recording capacity of the hard disk unit 12. Otherwise, if the memory card 11 is attached, a pattern representative of the shape of the memory card 11 may be displayed and, according to the number of remaining recordable or recorded exposures to be displayed or the recording capacity to be displayed, the shape of the pattern may be varied or the color or luminance of a part of or the whole of the pattern may be varied, thereby displaying the number of remaining recordable exposures or the number of recorded exposures. Thus, it is possible to automatically provide optimum display of the number of remaining recordable or recorded exposures or the recording capacity in accordance with the kind of the attached recording medium.

The number of remaining recordable or recorded exposures, the date of photography, a selected operating mode and so on are visually displayed on the basis of the management data, various kinds of modes set by the switch group 31 and the mode settings switched according to the recording-medium discrimination flag (step S10). Then, reading from the management data area of the recording medium attached to the camera body is performed to detect whether a recordable empty area is present in the information data area of the recording medium (Step S11).

If there is no recordable empty area, a warning display is provided (Step S12), and the flow returns to Step S2. If a recordable empty area is detected in Step S11, the flow proceeds to Step S13 of FIG. 3.

In Step S13, it is determined whether the distance·light measuring switch 42 is operated. If the distance·light measuring switch 42 is off, the flow returns to Step S2 of FIG. 1 (Step S13). If the distance·light measuring switch 42 is on, a distance measurement and a light measurement are respectively performed by the distance measuring circuit 25 and the light measuring circuit 26 so that the photographic lens unit 1 is focused onto the subject and the corresponding shutter time is determined (Step S14). These distance and light measuring operations will be described in more detail later.

If the distance·light measuring switch 42 is on and the recording switch 43 is off, the flow returns to Step S13 (Step S15). Thus, the distance measurement and the light measurement (Step S14) are repeated until the recording switch 43 is turned on.

If the recording switch 43 is turned on, photography is executed (Step S16). The photography will be described in detail later.

After photography for one exposure has been executed, if it is determined from the recording-medium discrimination flag that the memory card 11 is connected to the connector 13 of the camera body (Step S17), image data indicative of the photographed image is read from the buffer memory 8 and is written into the information data area 15 through the interface 10, the connector 13 as well as the connector 17 and the interface 16 of the memory card 11. Management data about the photographed image (i.e., the image data recorded in the information data area 15) is written into the management data area 14 (Step S18).

If the hard disk unit 12 is connected to the connector 13 of the camera body, detection of a vibration or a shock is performed by the vibration·shock detecting circuit 28 (Step S19). If the detected vibration or shock is smaller than a predetermined level, the image data is read from the buffer memory 8 in which the image data is temporarily stored, and is written into the information data area 20 through the interface 10, the connector 13 as well as the connector 22 and the interface 21 of the hard disk unit 12. Management data about the photographed image (i.e., the image data recorded in the information data area 20) is written into the management data area 19 (Step S18).

If the vibration or shock detected by the vibration·shock detecting circuit 28 in Step S19 is greater than the predetermined value, writing to the hard disk unit 12 is not performed (Step S19). If such writing can be performed after the vibration or shock has disappeared, the flow returns to Step S19 and detection of the vibration or shock is repeated (Step S20). If it is impossible is displayed for the vibration or the shock to disappear (for example, in the case of the continuous-shooting mode) (Step S20), a warning indicating that recording is impossible is displayed (Step S21), and the flow returns to Step S2 to FIG. 2.

When the writing of the image data is completed in Step S18, it is detected whether the continuous-shooting mode is set (Step S22). If it is desired to continue photography in the continuous-shooting mode, the flow returns to Step S13. If the continuous-shooting mode is not selected or the continuous-shooting mode is interrupted, the flow returns to Step S2 (Step S22).

Figure 4:
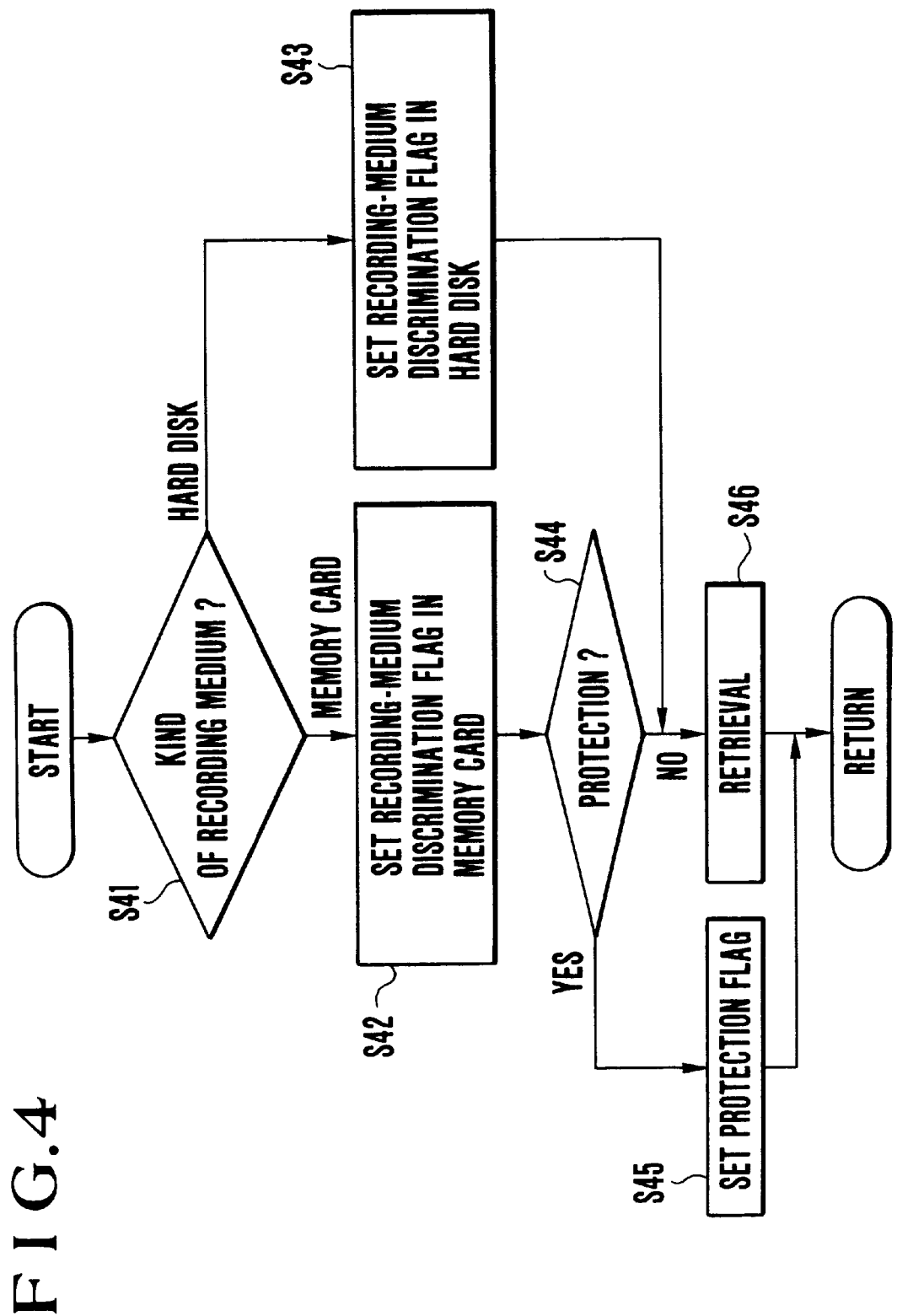
FIG. 4 is a flowchart of a retrieval routine according to the first embodiment.

The retrieval processing executed in Step S5 of FIG. 2 will be described below with reference to the flowchart of FIG. 4.

First of all, it is detected which of the memory card 11 and the hard disk unit 12 is connected to the connector 13 of the camera body (Step S41), and the recording-medium discrimination flag is set according to the result of the detection (Steps S42 and S43).

A number of methods for detecting the kind of the connected recording medium are available. As one example, connecting pins provided in the connector 13 may be utilized to detect which of the memory card 11 and the hard disk unit 12 is connected to the connector 13 of the camera body. As another example, a discrimination signal for discriminating a recording medium may be stored in the management data area of the recording medium in advance so that the electronic still camera can read the discrimination signal to make a decision as to the kind of the connected recording medium.

If the memory card 11 is connected to the connector 13 of the camera body as the recording medium, the state of the write protection 18 is read through the interface 10 and the connector 13 as well as the connector 17 and the interface 16 of the memory card 11 (Step S44). If the write protection 18 is set, the protection flag is set (Step S45). If the write protection 18 of the memory card 11 is not set (Step S44), the management data is read from the management data area 14 through the interface 10 and the connector 13 as well as the connector 17 and the interface 16 of the memory card 11, while if the hard disk unit 12 is connected to the connector 13 of the camera body as the recording medium, the management data is read from the management data area 19 through the interface 10 and the connector 13 as well as the connector 22 and the interface 21 of the hard disk unit 12 (Step S46). The retrieval processing executed in Step S5 for performing retrieval of the management data about the connected recording medium is as described above.

Figure 5:
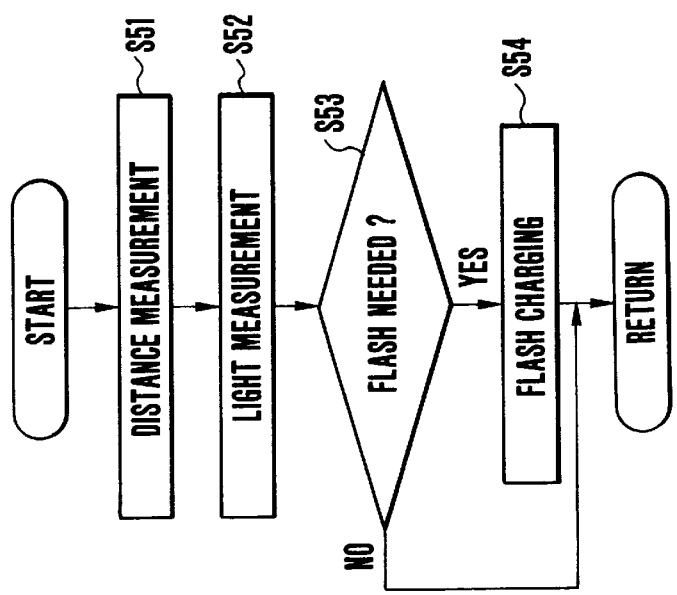
FIG. 5 is a flowchart of a distance measurement light measurement routine according to the first embodiment.

The distance and light measuring operations executed in Step S14 of FIG. 3 will be described below with reference to the flowchart of FIG. 5.

First of all, the distance to the subject is measured by the distance measuring circuit 25, and the obtained measurement data is stored in the controlling memory 30 (Step S51), and the luminance of the subject is measured by the light measuring circuit 26, and the obtained measurement data is stored in the controlling memory 30 (Step S52).

It is determined whether flashing is needed from the measured-light value provided by the light measuring circuit 26 (Step S53). If flashing is needed, a flash flag is set and the flash unit 27 is charged (Step S54). The processing for the distance and light measuring operations executed in Step S14 of FIG. 3 is as described above.

Figure 3:
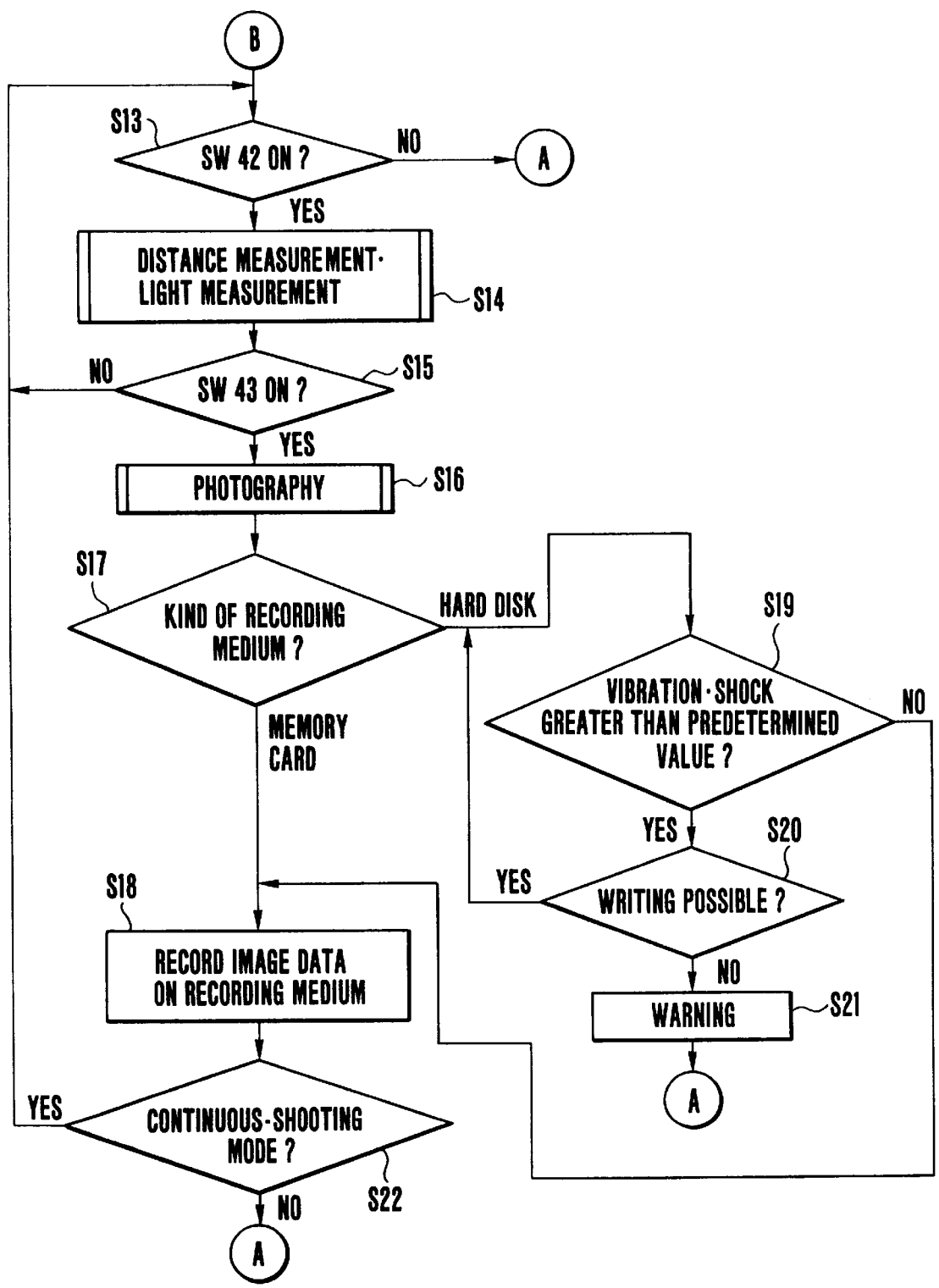
FIG. 3 is a partial flowchart of the main routine according to the first embodiment.
Figure 6:
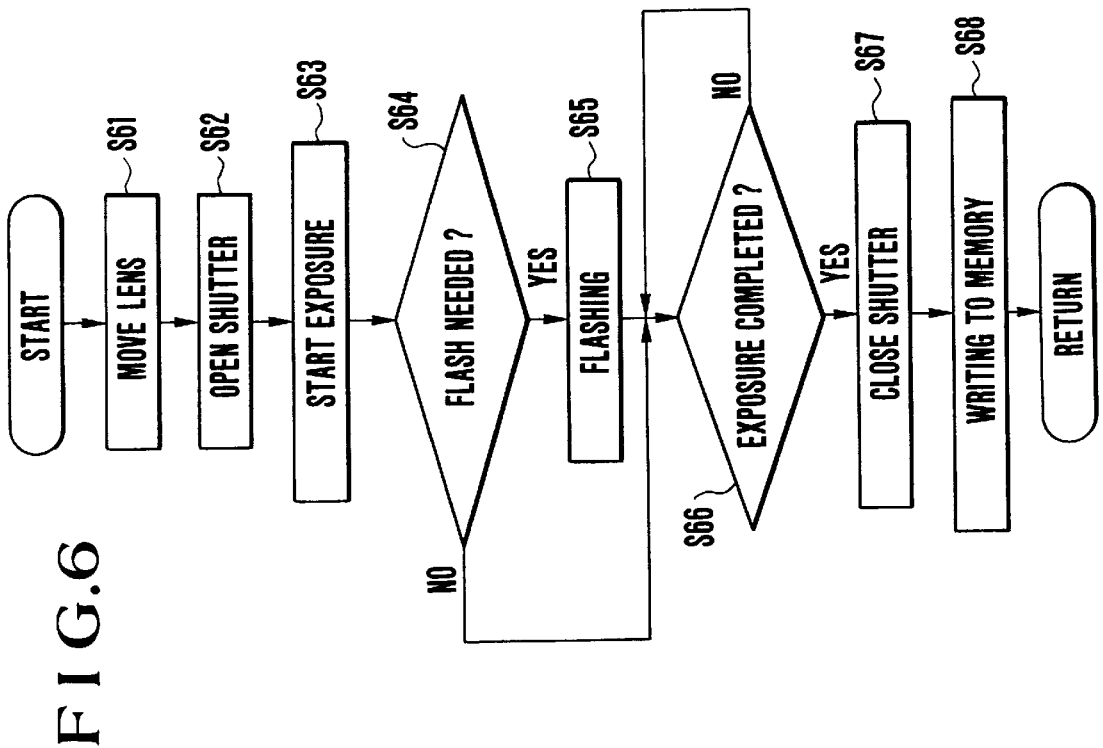
FIG. 6 is a flowchart of an image recording routine according to the first embodiment.

FIG. 6 is a flowchart showing in detail the photography (image recording) executed in Step S16 of FIG. 3.

The system controlling circuit 32 reads the measured-distance data indicative of the distance to the subject, which is stored in the controlling memory 30, and causes the lens driving circuit 23 to drive the focusing lens of the photographic lens unit 1, thereby bringing the subject into focus (Step S61). In addition, the system controlling circuit 32 causes the shutter driving circuit 24 to open the shutter 2, thereby exposing the image sensor 3, in accordance with the measured-light data stored in the controlling memory 30 (steps S62 and S63).

It is determined from the flash flag whether the flash unit 27 is needed (Step S64), and the flash unit 27 is flashed if needed (Step S65). Then, the system controlling circuit 32 waits for completion of the exposure of the image sensor 3 (Step S66). After the exposure of the image sensor 3 has been completed, the system controlling circuit 32 closes the shutter 2 (Step S67) and reads a charge signal from the image sensor 3. The charge signal which is data indicative of the photographed image is read into the buffer memory 8 through the process circuit 4, the A/D converter 5 and, if compression is needed, both of the compression circuit 6 and the switch 7 or, if no compression is needed, only the switch 7.

Subsequently, the image data is read from the buffer memory 8 and transferred through the interface 10 to the connector 13. If the memory card 11 is connected to the connector 13 of the camera body, the image data is written into the information data area 15 through the connector 17 and the interface 16, while, if the hard disk unit 12 is connected to the connector 13 of the camera body, the image data is written into the information data area 20 through the connector 22 and the interface 21 (Step S68).

Furthermore, information associated with the photographed-image data (for example, the kind of the compression mode and the date on which the photographed image has been obtained) is recorded in the management data area 14 or 19.

An electronic still camera according to a second embodiment of the present invention will be described in detail below with reference to the associated drawings.

Figure 7:
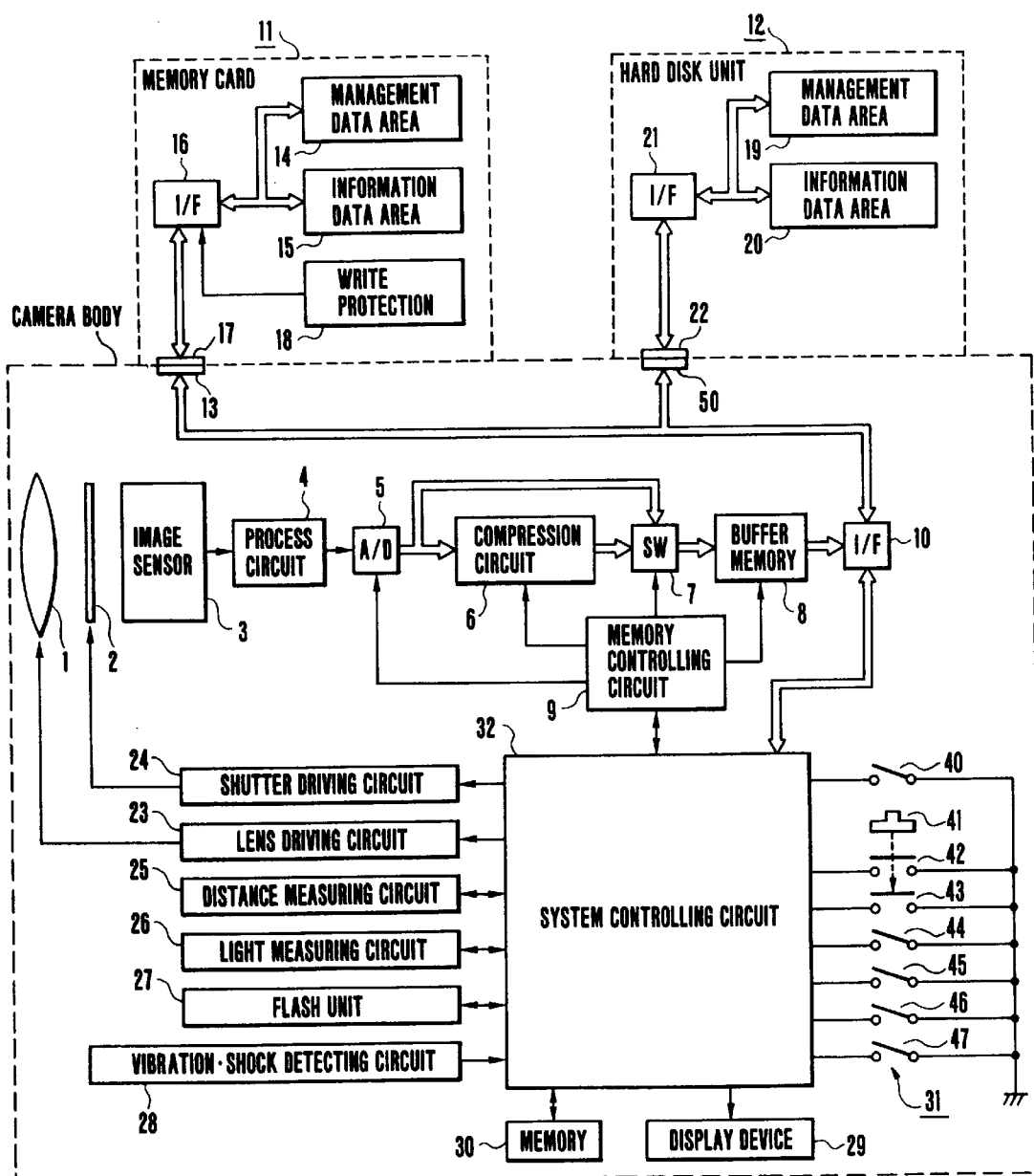
FIG. 7 is a block diagram of an electronic still camera according to a second embodiment of the present invention.

In FIG. 7, the same reference numerals are used to denote elements which are substantially identical to those shown in FIG. 1, and description thereof is omitted for the sake of simplicity.

The electronic still camera according to the second embodiment has a camera body further provided with a connector 50, which is substantially identical to the connector 13, so that two recording media in which photographed-image data is to be recorded can be attached to the camera body.

The operational control of the electronic still camera according to the second embodiment will be described in detail below with reference to FIGS. 7 to 9.

Figure 8:
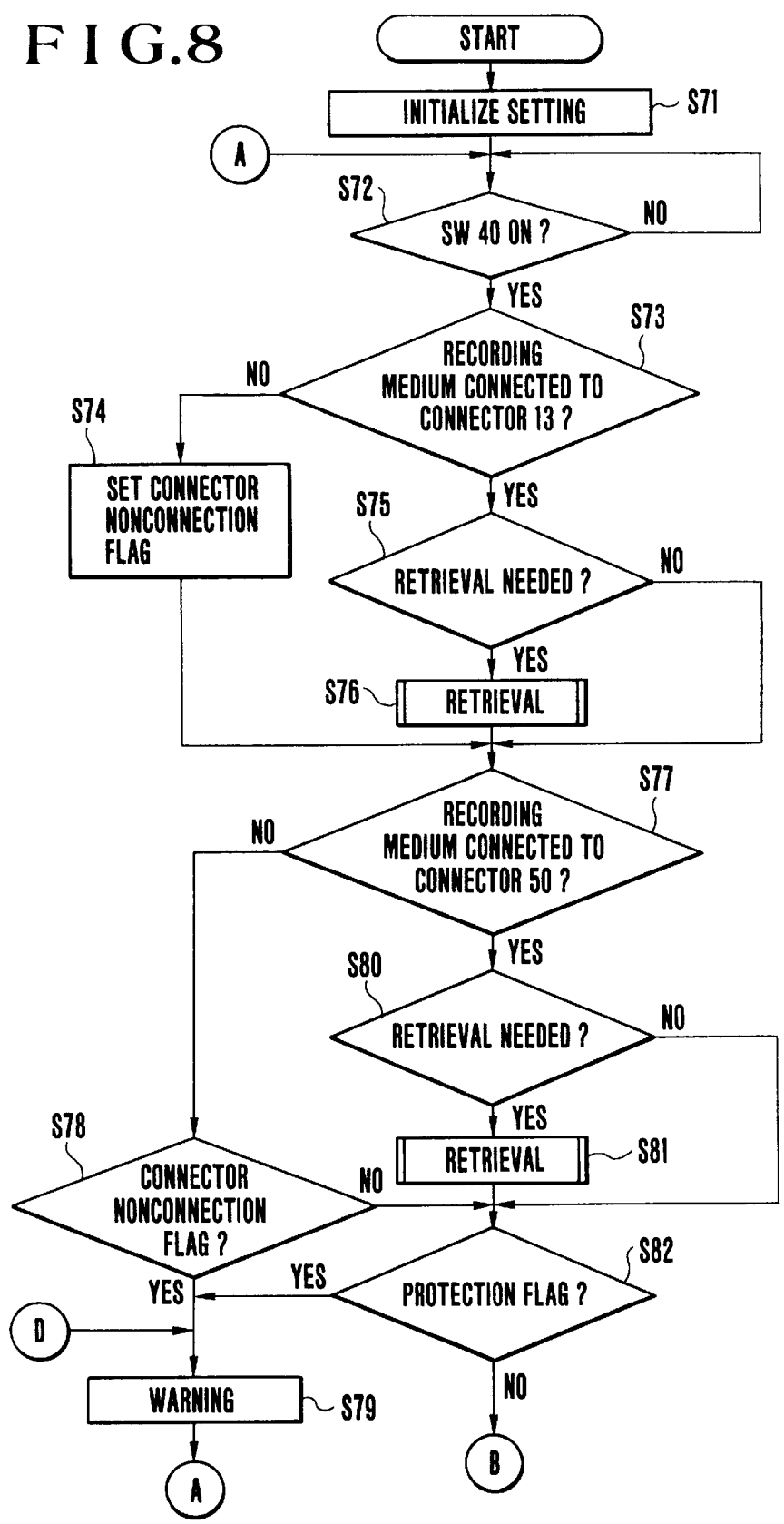
FIG. 8 is a partial flowchart of a main routine according to the second embodiment.
Figure 9:
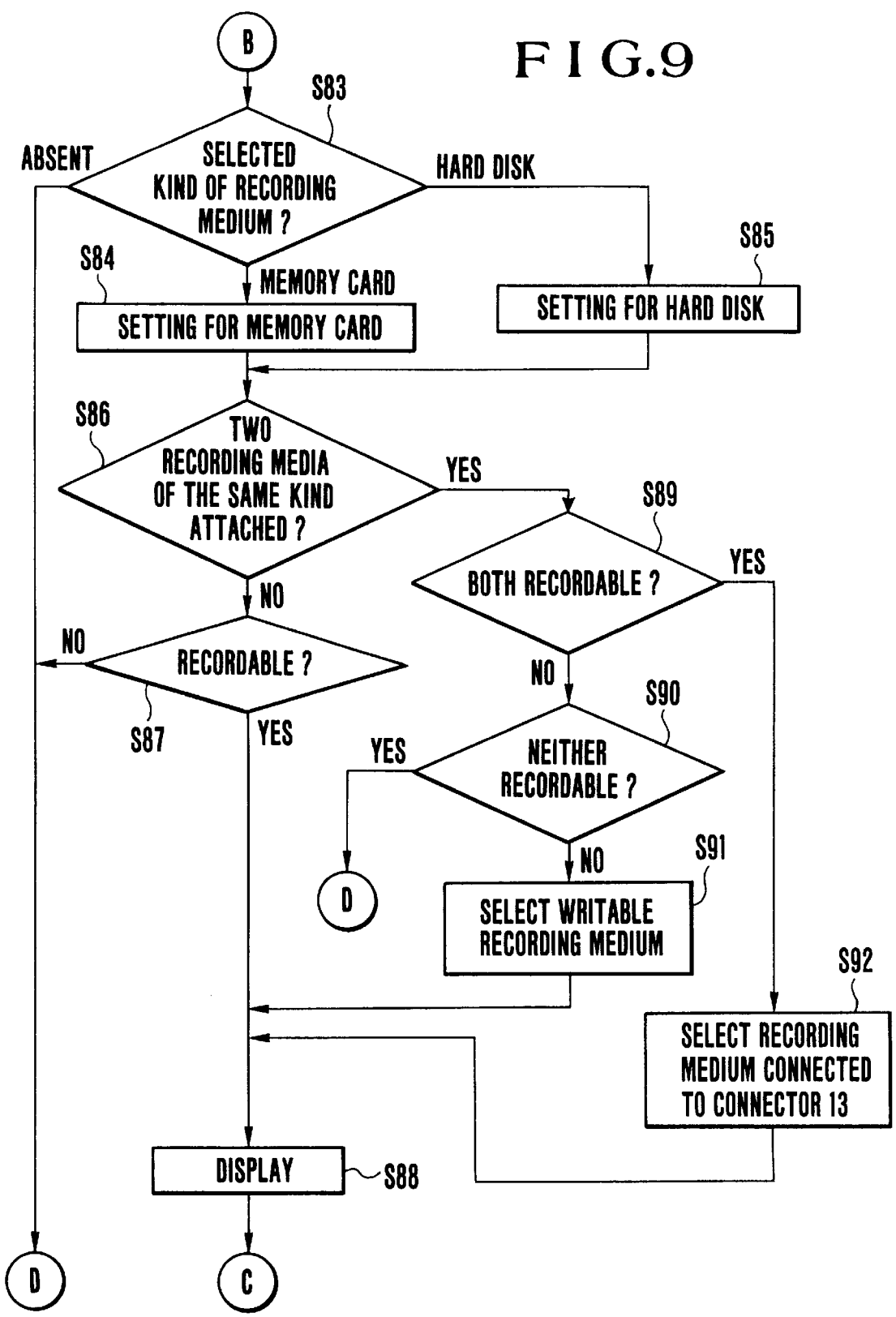
FIG. 9 is a partial flowchart of the main routine according to the second embodiment.

FIGS. 8 and 9 are flowcharts showing a main routine which is followed by the electronic still camera according to the second embodiment.

When the power supply (not shown) is turned on, the system controlling circuit 32 initializes the flags, the control variables and so on (Step S71). When the main switch 40 is closed (Step S72), it is determined whether the recording medium (the memory card 11 or the hard disk unit 12 in the second embodiment) is connected to the connector 13 of the camera body (Step S73).

If it is determined that the recording medium is not connected to the connector 13 of the camera body, a connector nonconnection flag is set (Step S74).

If it is determined that the recording medium is connected to the connector 13 of the camera body (Step S73), and further if it is determined that no management data about the recording medium connected to the connector 13 has yet been read (Step S75), retrieval of the management data about the recording medium connected to the connector 13 of the camera body is performed (Step S76). The retrieval executed in Step S76 is similar to that described above with reference to the flowchart of FIG. 4.

If the retrieval of the management data about the recording medium connected to the connector 13 is completed, it is determined whether the recording medium (the memory card 11 or the hard disk unit 12 in the second embodiment) is connected to the connector 50 of the camera body (Step S77).

If it is determined that the recording medium is not connected to the connector 50 of the camera body, the state of the connector nonconnection flag is checked (step S78). If it is determined that no recording medium is connected to either of the connectors 13 and 50, a warning indicating that no recording medium is attached to the camera body is provided (Step S79). Then, the flow returns to Step S72.

If it is determined that the recording medium is connected to the connector 50 of the camera body (Step S77), and further if it is determined that no management data about the recording medium connected to the connector 50 has yet been read (Step S80), retrieval of the management data about the recording medium connected to the connector 50 of the camera body is performed (Step S81).

If it is determined from the retrieval steps S76 and S81 that the memory card 11 is connected to the connector 13 or 50, and if the protection flag is set which indicates that the set state of the write protection 18 has been detected (Step S82), a warning is displayed to inform a photographer that a nonrecordable recording medium is connected (Step S79). Then, the flow returns to Step S72. If it is determined in Step S82 that the protection flag is not set, the flow proceeds to Step S83 of FIG. 9.

The flowchart of FIG. 9 will be referred to below.

It is determined which of the memory card 11 and the hard disk unit 12 is presently set as a selected recording medium (Step S83). On the basis of the result of the decision, the recording-medium discrimination flag is set and the settings associated with both the operating mode and the display mode are switched (Step S84 or S85). If no set recording medium is connected, the flow returns to Step S79 of FIG. 8. The operation of the setting switching is similar to that explained in connection with the first embodiment.

Then, it is determined whether the recording medium set in Step S83 is connected to each of the connectors 13 and 50 (Step S86).

If it is determined in Step S86 that the recording medium is only connected to either one of the connectors 13 and 50, it is determined in Step S87 whether the information data area of the recording medium set in Step S83 contains a recordable empty area. If it is determined that there is no recordable empty area, the flow returns to Step S79 of FIG. 8.

If it is determined in Step S87 that there is a recordable empty area, the number of remaining recordable or recorded exposures, the date of photography, a selected operating mode and so on are visually displayed on the basis of the management data, the various kinds of modes set by the switch group 31 and the mode settings switched according to the recording-medium discrimination flag (Step S88).

If it is determined in Step S86 that the recording medium set in Step S83 is connected to each of the connectors 13 and 50, it is determined in Step S89 whether both recording media are writable. If it is determined that both of them are writable, the recording medium connected to the connector 13 is automatically selected (Step S92) and the flow proceeds to Step S88. Although not described herein, it is also possible to adopt an arrangement which allows the photographer to manually select the recording medium connected to the connector 13 by operating an operating switch provided on the camera body.

If it is not determined in Step S89 that both of the recording media are writable, it is determined whether neither of the recording media is writable (Step S90). If it is determined that neither of them is writable, the flow returns to Step S79 of FIG. 8.

If it is not determined in Step S90 that neither of the recording media is writable, the writable recording medium is automatically selected, and the number of remaining recordable or recorded exposures, the date of photography and a selected operating mode are visually displayed on the basis of the management data, the various kinds of modes set by the switch group 31 and the mode settings switched according to the recording-medium discrimination flag, and, in addition, a visual display indicating that the nonrecordable recording medium is also connected is provided (Step S88).

Figure 10:
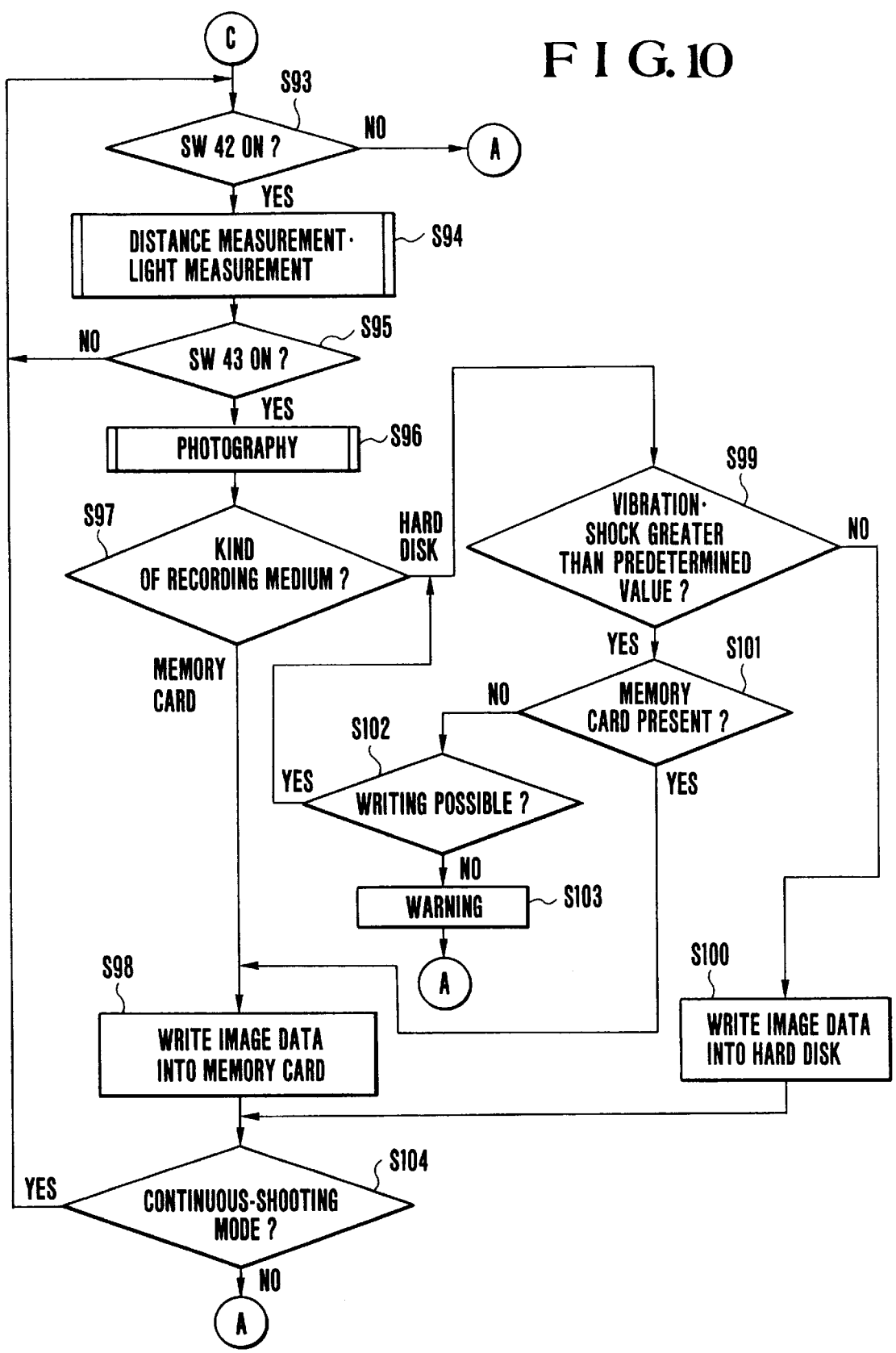
FIG. 10 is a partial flowchart of the main routine according to the second embodiment.

The flow proceeds from Step S88 to Step S93 of FIG. 10.

It is determined whether the distance-light measuring switch 42 is operated. If the distance-light measuring switch 42 is off, the flow returns to Step S72 of FIG. 8 (Step S93). If the distance-light measuring switch 42 is on, a distance measurement and a light measurement are respectively performed by the distance measuring circuit 25 and the light measuring circuit 26 so that the photographic lens unit 1 is focused onto a subject and the corresponding shutter time is determined (Step S94). These distance and light measuring operations are similar to those described with reference to the flowchart of FIG. 5 in connection with the first embodiment.

If the distance-light measuring switch 42 is on and the recording switch 43 is off, the flow returns to Step S93 (Step S95). Thus, the distance measurement and the light measurement (Step S94) are repeated until the recording switch 43 is turned on.

If the recording switch 43 is turned on, photography is executed (Step S96). The operation of the photography (image recording) is similar to that described with reference to the flowchart of FIG. 6 in connection with the first embodiment.

After photography for one exposure has been executed, it is determined from the recording-medium discrimination flag that the memory card 11 is set as a recording medium selected to record image data therein (Step S97), image data indicative of the photographed image is read from the buffer memory 8 and is written into the information data area 15 through the interface 10, the connector 13 as well as the connector 17 and the interface 16 of the memory card 11. Management data about the photographed image (i.e., the image data recorded in the information data area 15) is written into the management data area 14 (Step S98).

If the hard disk unit 12 is set as a recording medium selected to record image data therein, detection of a vibration or a shock is performed by the vibration-shock detecting circuit 28 (Step S99). If the vibration-shock detecting circuit 28 does not detect a vibration or shock greater than or equal to a predetermined value, the image data is read from the buffer memory 8, and is written into the information data area 20 through the interface 10, the connector 13 as well as the connector 22 and the interface 21 of the hard disk unit 12. Management data about the photographed image (i.e., the image data recorded in the information data area 20) is written into the management data area 19 (Step S100). The vibration-shock detecting circuit 28 detects a vibration or shock greater than or equal to the predetermined value (Step S99), and it is determined whether the memory card 11 is attached to the camera body (step S101). If it is determined that the memory card 11 is attached, settings for the memory card 11 are selected as those for the recording medium selected to record image data therein. Then, the image data indicative of the photographed image is read from the buffer memory 8, and is written into the information data area 15 through the interface 10, the connector 13 as well as the connector 17 and the interface 16 of the memory card 11. Management data about the photographed image (i.e., the image data recorded in the information data area 15) is written into the management data area 14 (Step S98).

If it is determined that the memory card 11 is not attached to the camera body, writing to the hard disk unit 12 is not performed (step S101). If the writing to the hard disk unit 12 is performed after the vibration or the shock has disappeared, the flow returns to Step S99, where the detection of the vibration or the shock is again performed (Step S102). If it is impossible to wait for the vibration or the shock to disappear (for example, in the case of the continuous-shooting mode) (Step S102), a warning indicating that recording is impossible is displayed (Step S103), and the flow returns to Step S72 of FIG. 8.

When the writing of the image data is completed, it is detected whether the continuous-shooting mode is set (step S104). If it is desired to continue photography in the continuous-shooting mode, the flow returns to Step S93. If the continuous-shooting mode is not selected or the continuous-shooting mode is interrupted, the flow returns to Step S72 of FIG. 8 (Step S104).

An electronic still camera according to a third embodiment of the present invention will be described in detail below with reference to the associated drawings.

Since the circuit construction of the electronic still camera according to the third embodiment is similar to that of the electronic still camera according to the second embodiment, description thereof is omitted for the sake of simplicity (refer to FIG. 7).

The operational control of the electronic still camera according to the third embodiment will be described in detail below with reference to FIG. 11.

Figure 11:
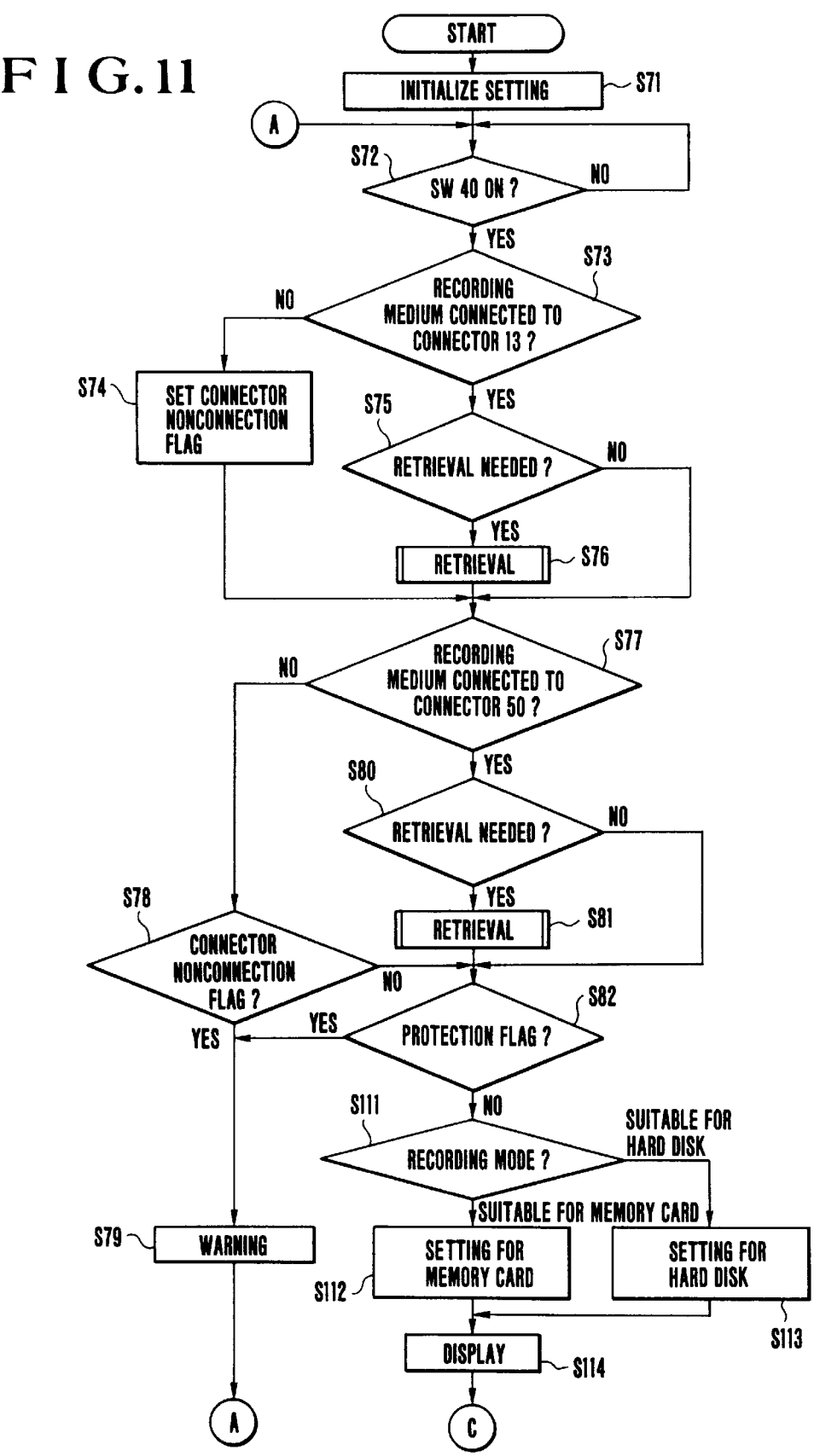
FIG. 11 is a partial flowchart of a main routine according to a third embodiment.

In FIG. 11, the same step numerals are used to denote steps which are identical in operation to those shown in FIG. 8, and the following description refers to steps which differ from those of FIG. 8.

In Step S111, it is determined which recording mode is presently set (for example, the state of the write protection 18, the number of recordable pictures, the number of recorded pictures and mode settings specified by the switch group 31). On the basis of the presently set recording mode, an optimum recording medium is selected from the recording media attached to the camera body, and the settings associated with the display mode are switched according to the selected recording medium (Steps S112 and S113).

The number of remaining recordable or recorded exposures, the date of photography and the selected operating mode are visually displayed on the basis of the management data, the various kinds of modes set by the switch group 31 and the mode settings switched according to the recording-medium discrimination flag (Step S114). The flow proceeds from Step S114 to Step S93 of FIG. 10 which has been described above. In this case, the flow shown in FIG. 10 returns to the connection symbol A shown in FIG. 11.

The operation of a routine in which steps for preventing the influence of a vibration or a shock are added to the hard-disk writing routine of Step S20 of FIG. 3 or Step S100 of FIG. 10 will be described below with reference to the flowchart of FIG. 12.

Image data indicative of a photographed image is read from the buffer memory 8 and is written into the information data area 20 through the interface 10, the connector 13 as well as the connector 22 and the interface 21 of the hard disk unit 12. Management data about the photographed image (i.e., the image data recorded in the information data area 20) is written into the management data area 19 (Step S201). If the vibration-shock detecting circuit 28 does not detect a vibration or shock greater than or equal to a predetermined value (Step S202), the hard-disk writing routine is brought to an end.

If the vibration-shock detecting circuit 28 does not detect a vibration or shock greater than or equal to the predetermined value (Step S202), the management data written into the management data area 19 and the image data written into the information data area 20 are read out through the interface 21 and the connector 22 of the hard disk unit 12 as well as the connector 13 (or the connector 50) and the interface 10. Then, the read management and image data are respectively verified on the basis of the management data which is held in and will have been written by the system controlling circuit 32 and the image data stored in the buffer memory 8 (Step S203).

If the verify processing proves that there is no error, the hard-disk writing routine is brought to an end (Step S204). If an error is detected (Step S204), the flow returns to Step S201 and writing to the hard disk unit 12 and the verify processing are repeated until the number of repetitions of the verify processing reaches a predetermined number of times "n" (Step S205). In this case, it is also effective to execute sequential or random writing to cylinders or sectors in the hard disk unit 12 and sequentially or randomly verify the written data at intervals of an arbitrary number of times.

If an error is detected after the predetermined number of repetitions of the verify processing (Step S205), a warning indicating that recording is impossible is displayed (Step S206), and the flow returns to the connection symbol A.

An electronic still camera according to a fourth embodiment of the present invention will be described in detail below with reference to the associated drawings.

Figure 13:
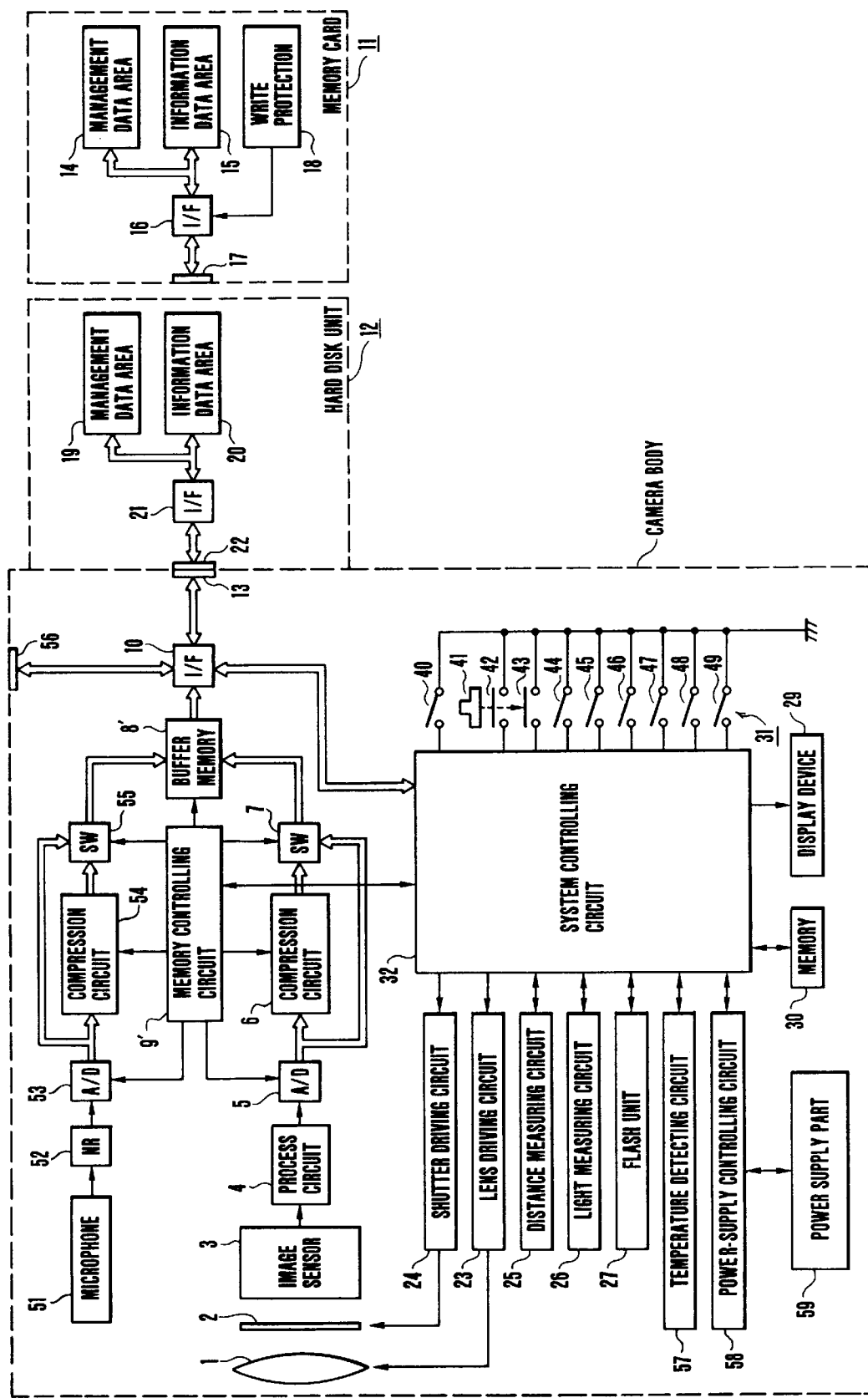
FIG. 13 is a block diagram of an electronic still camera according to a fourth embodiment of the present invention.

FIG. 13 is a block diagram of the electronic still camera according to the fourth embodiment of the present invention. In FIG. 13, the same reference numerals are used to denote elements which are substantially identical to those shown in FIG. 1, and description thereof is omitted for the sake of simplicity.

The electronic still camera shown in FIG. 13 further includes a microphone 51 for input of an external sound, a noise reduction circuit 52 for reducing the noise of an audio signal outputted from the microphone 51, an A/D converter 53 for converting an analog output from the noise reduction circuit 52 into a digital sinal, a sound compression circuit 54 for performing data compression using adaptive differential PCM (DPCM) or the like, and a selecting switch 55 for performing switching between the transfer of sound data compressed by the sound compression circuit 54 and that of sound data which has bypassed the sound compression circuit 54.

The shown electronic still camera also includes a buffer memory 8' for temporarily storing image data (video signal) and/or sound data (audio signal), and the stored video and/or sound signal can be read from the buffer memory 8' at a desired rate under control of a memory controlling circuit 9' which will be described later.

The memory controlling circuit 9' is provided for controlling the A/D converters 5 and 53, the image compression circuit 6, the sound compression circuit 54, the selecting switches 7 and 55 and the buffer memory 8'. During the compression of the image data, the compressed image data outputted from the image compression circuit 6 is written into the buffer memory 8', while, during the noncompression of the image data, the image data outputted from the A/D converter 5 is written into the same, under control of the memory controlling circuit 9'. During the compression of the sound data, the compressed sound data outputted from the sound compression circuit 54 is written into the buffer memory 8', while, during the noncompression of the sound data, the sound data outputted from the A/D converter 53 is written into the same, under control of the memory controlling circuit 9'.

The shown electronic still camera also includes a temperature detecting circuit 57 for detecting the temperature of a recording medium or the presence or absence of a dew condensation or a freeze on the recording medium.

The shown electronic still camera also includes a power-supply controlling circuit 58 for detecting the state of a power supply part 59 and controlling the power supply part 59, and the power supply part 59. The power supply part 59 is made up of elements such as a battery, a DC-DC converter and a switch for selecting a block to be energized, and is controlled by the power-supply controlling circuit 58.

The power-supply controlling circuit 58 detects the presence or absence of an attached battery, the kind of the attached battery and the amount of power remaining in the attached battery, and controls the power supply part 59 in accordance with the result of the detection and an instruction supplied from the system controlling circuit 32.

The switch group 31 of the fourth embodiment is further provided with a main switch 48 for turning on or off a sound recording operation and a sound-recording executing switch 49 for specifying execution of sound recording.

A connector 56 is disposed for providing connection to an external device.

Operational control provided over the electronic still camera which is arranged in the above-described manner will be described in detail below with reference to FIGS. 13 through 15.

Figure 14:
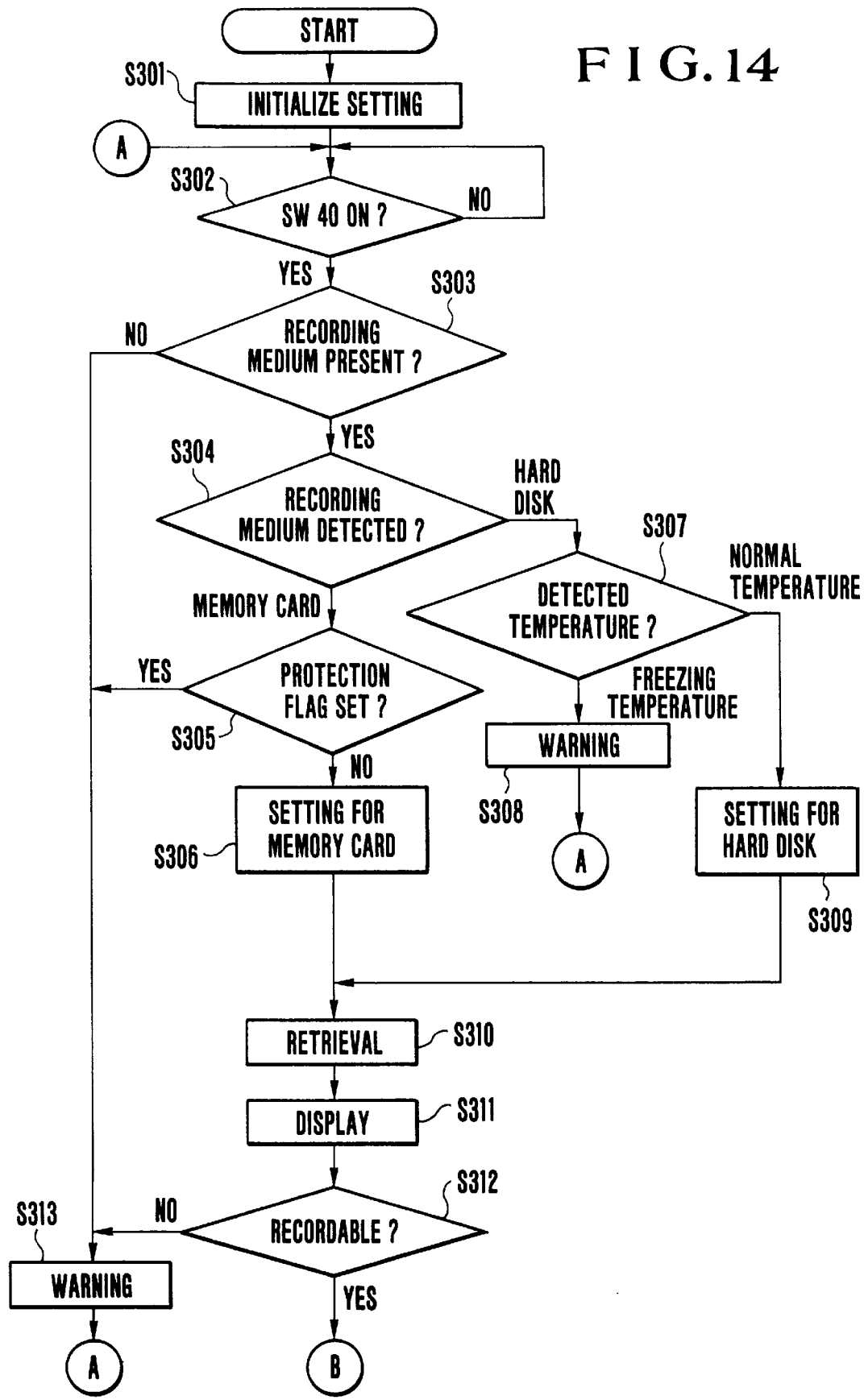
FIG. 14 is a partial flowchart of a main routine according to the fourth embodiment.
Figure 15:
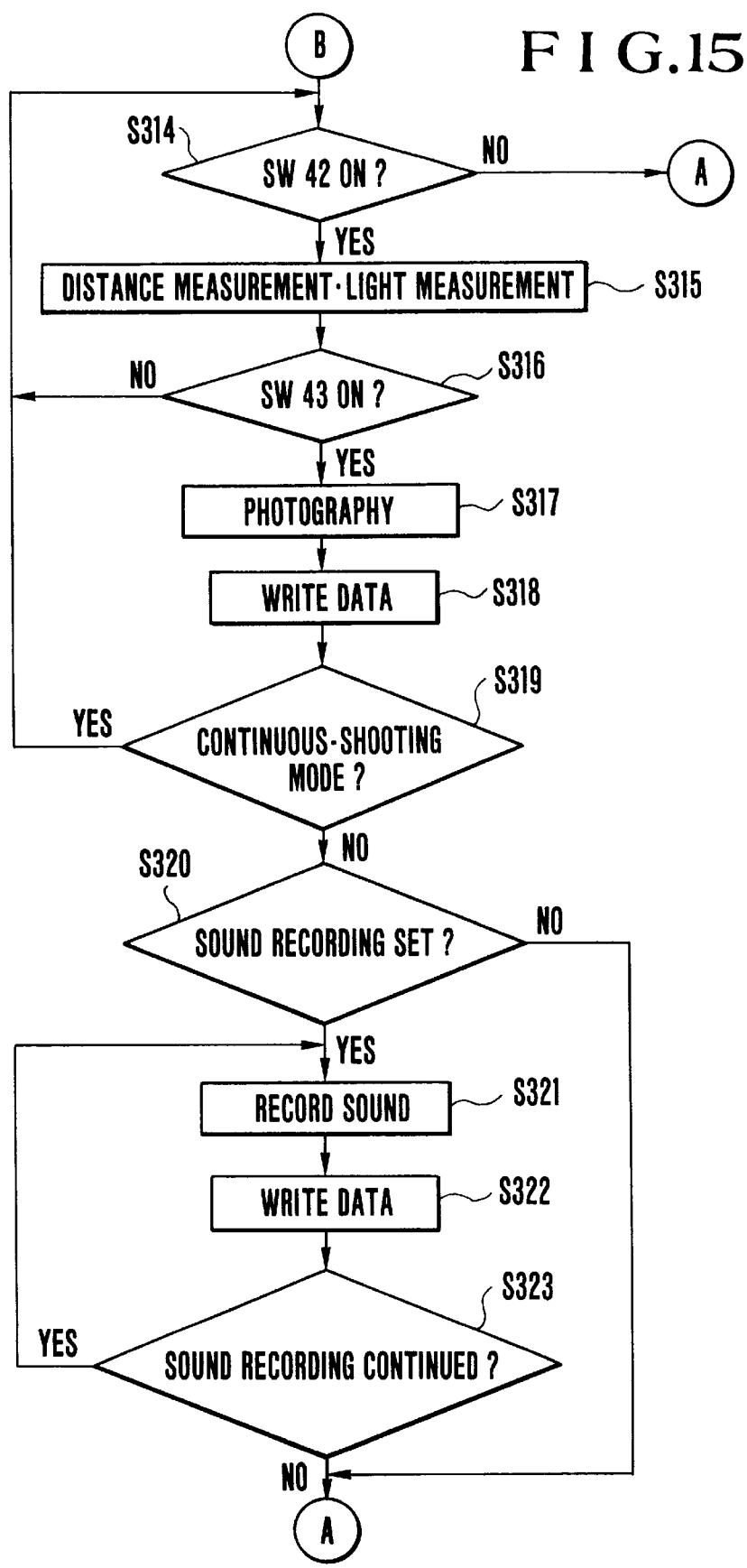
FIG. 15 is a partial flowchart of the main routine according to the fourth embodiment.

FIGS. 14 and 15 are flowcharts showing a main routine which is followed by the electronic still camera according to the fourth embodiment.

Referring to FIG. 14, when the power supply part 59 is turned on, the system controlling circuit 32 initializes the flags, the control variables and so on (Step S301). When the main switch 40 is closed (Step S302), it is determined whether the recording medium (the memory card 11 or the hard disk unit 12 in the fourth embodiment) is attached to the camera body (Step S303). A method for determining whether the recording medium is attached to the camera body is by utilizing a check pin among the connecting pins of the connector 13. The decision is made in such a way that a flag is set if the check pin is closed and, if the check pin is open, the flag is not set.

Otherwise, it is also preferable to adopt a decision method in which an electrical signal is transmitted from the camera side to the recording medium and, if a response returns to the camera side, it is determined that the recording medium is attached to the camera body.

If it is determined that the recording medium is not connected to the connector 13 of the camera body (Step S303), a warning indicating that no recording medium is attached to the camera body is displayed (Step S313). Then, the flow returns to Step S302.

If it is determined that the recording medium is connected to the connector 13 of the camera body (Step S303), detection is made to discriminate the kind of the attached recording medium (Step S304). The detection made to discriminate the kind of the attached recording medium will be described in detail later.

If a recording-medium discrimination flag set according to the result of the detection made in Step S304 indicates the memory card 11, it is determined whether the write protection 18 is set (Step S305).

If it is determined that the write protection 18 is set, a warning indicating that writing is inhibited is displayed (Step S313), and the flow returns to Step S302. If the write protection 18 is set, the settings that are associated with the control variables, the operating mode, the display mode and so on are switched according to the memory card 11 which is the connected recording medium (Step S306).

If a recording-medium discrimination flag set according to the result of the detection made in Step S304 indicates the hard disk unit 12, the temperature detecting circuit 57 is made to measure the temperature of the hard disk unit 12 and a decision is made as to the presence or absence of a dew condensation or a freeze (Step S307).

If it is determined that the dew condensation or the freeze has occurred, a warning to that effect is displayed on the display device 29 (Step S308), and the flow returns to Step S302. This processing serves to prevent a recording failure from occurring due to the freeze or a temperature at which the hard disk unit 12 cannot perform a correct recording operation. In addition, it is possible to prevent damage to the hard disk unit 12.

If it is determined in Step S307 that neither the dew condensation nor the freeze has occurred, the settings that are associated with the control variables, the operating mode, the display mode and so on are switched according to the hard disk unit 12 which is the connected recording medium (Step S309).

The processing of Step S306 or S309 is performed as follows. For example, if the memory card 11 is attached, a frame speed for the continuous-shooting mode is made faster than when the hard disk unit 12 is attached. In addition, if the memory card 11 is attached, the frame speed for the continuous-shooting mode is maintained until the end of the recordable area is reached. However, if the hard disk unit 12 is attached, the frame speed for the continuous-shooting mode is only maintained until the maximum number of exposures recordable in the buffer memory 8' is reached, or a continuous shooting is stopped when the maximum number of exposures recordable in the buffer memory 8 is reached. Thus, it is possible to automatically execute continuous shooting according to an access time peculiar to each kind of recording medium.

The compression ratio of the image compression circuit 6 is selected so that if the hard disk unit 12 is attached, a method which is advantageous in terms of reversibility can be set and so that if the memory card 11 is attached, a method which is advantageous in terms of compression efficiency can be set. Otherwise, if the hard disk unit 12 is attached, a compression operation is stopped.

The compression ratio of the sound compression circuit 54 is controlled similarly to the compression ratio of the image compression circuit 6. Otherwise, if the hard disk unit 12 is attached, a sound-recording time is made longer than when the memory card 11 is attached. Otherwise, if the memory card 11 is attached, a sound recording operation is stopped.

Adequate compression settings are selected from among the above-described image and sound compression settings, and processing operations for image recording and sound recording are appropriately controlled according to the kind of the recording medium attached to the camera body (the memory card 11 or the hard disk unit 12 in the fourth embodiment). Thus, if the memory card 11 is attached, a photographic operation in which a higher priority is assigned to the number of recordable exposures is selected, whereas, if the hard disk unit 12 is attached, a photographic operation in which a higher priority is assigned to image quality is selected.

In addition, if the memory card 11 is attached, the number of remaining recordable exposures or the number of recorded exposures is numerically displayed. If the hard disk unit 12 is attached, the number of remaining recordable exposures or the number of recorded exposures is visually displayed in the form of the deformation of a graphics pattern or a variation in the number of bars since a numerical display is difficult for the photographer to understand because of the enormous recording capacity of the hard disk unit 12. Otherwise, if the memory card 11 is attached, a pattern representative of the shape of the memory card 11 may be displayed and, according to the number of remaining recordable or recorded exposures to be displayed or the recording capacity to be displayed, the shape of the pattern may be varied or the color or luminance of a part of or the whole of the pattern may be varied, thereby displaying the number of remaining recordable exposures or the number of recorded exposures. Thus, it is possible to automatically provide optimum display of the number of remaining recordable or recorded exposures or the recording capacity in accordance with the kind of the attached recording medium.

After the above-described setting processing on the camera-body side has been completed, retrieval of the management data about the recording medium attached to the camera body is performed (Step S310).

The number of remaining recordable or recorded exposures, the date of photography, the selected operating mode and so on are visually displayed on the basis of the management data, the various kinds of modes set by the switch group 31 and the mode settings switched according to the recording-medium discrimination flag (Step S311). Then, it is determined whether a recordable empty area is present in the information data area of the recording medium attached to the camera body (Step S312). If there is no recordable empty area, a warning is displayed on the display device 29 (Step S313), and the flow returns to Step S302. If a recordable empty area is detected in Step S312, the flow proceeds to Step S314 of FIG. 15.

If the distance-light measuring switch 42 is off, the flow returns to Step S302 of FIG. 14 (Step S314). If the distance-light measuring switch 42 is on, a distance measurement and a light measurement are respectively performed by the distance measuring circuit 25 and the light measuring circuit 26 so that the photographic lens unit 1 is focused onto the subject and the corresponding shutter time is determined (Step S315). Description of these distance and light measuring operations is omitted since they are similar to those described above with reference to the flowchart of FIG. 5.

If the distance-light measuring switch 42 is on and the recording switch 43 is off, the flow returns to Step S314 (Step S316). Thus, the distance measurement and the light measurement (Step S315) are repeated until the recording switch 43 is turned on.

If the recording switch 43 is turned on, photography is executed (Step S317). Since the operation of the photography (image recording) is similar to that described with reference to the flowchart of FIG. 6 in connection with the first embodiment, description thereof is omitted for the sake of simplicity.

After photography for one exposure has been executed, if the memory card 11 is attached to the camera body, image data indicative of the photographed image is read from the buffer memory 8' and is written into the information data area 15 through the interface 10, the connector 13 as well as the connector 17 and the interface 16 of the memory card 11. Management data about the photographed image (i.e., the image data recorded in the information data area 15) is written into the management data area 14 (Step S318).

If the hard disk unit 12 is attached to the camera body, the image data is read from the buffer memory 8' in which the image data is temporarily stored, and is written into the information data area 20 through the interface 10, the connector 13 as well as the connector 22 and the interface 21 of the hard disk unit 12. Management data about the photographed image (i.e., the image data recorded in the information data area 20) is written into the management data area 19 (Step S318).

When the writing of the image data is completed, it is detected whether the continuous-shooting mode is set (Step S319). If it is desired to continue photography in the continuous-shooting mode, the flow returns to Step S314. If the continuous-shooting mode is not selected or the continuous-shooting mode is interrupted, the flow returns to Step S320.

In Step S320, it is determined whether execution of sound recording is set. If it is determined that the execution of sound recording is not set, the flow returns to Step S302.

If it is determined that the execution of sound recording is set, sound data is stored in the buffer memory 8' (Step S321). After being stored, the sound data is read from the buffer memory 8', and the sound data is written into the information data area of the recording medium and management data about the written sound data is written into the management data area (Step S322).

If it is desired to continue the sound recording, the flow returns to Step S321. If the sound recording is not continued, the flow returns to Step S302 of FIG. 14 (Step S323).

The flowchart of the main routine according to the fourth embodiment is as described above.

Figure 16:
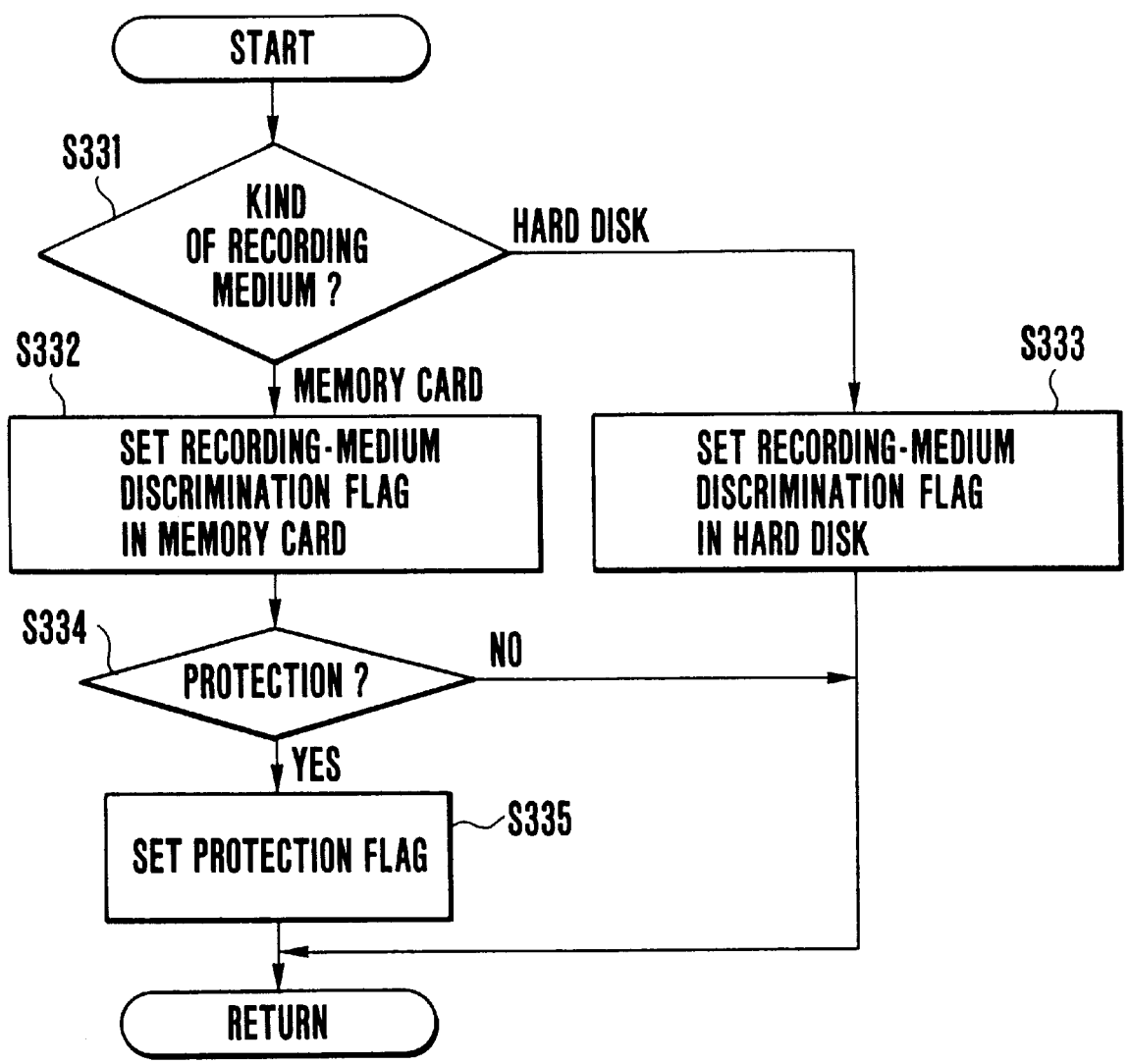
FIG. 16 is a flowchart of a recording-medium discrimination routine according to the fourth embodiment.

The recording-medium detecting operation executed in Step S304 of FIG. 14 will be described in detail below with reference to the flowchart of FIG. 16.

First of all, it is detected which of the memory card 11 and the hard disk unit 12 is attached to the camera body (Step S331). The detecting method is realized by reading a discrimination code written in the management data area or another area of the attached recording medium and detecting the kind of the attached recording medium. The discrimination code contains other codes such as a code indicative of the name of the manufacturer of the recording medium and a code indicative of the recording capacity thereof.

Otherwise, ROMs in which discrimination data are stored may be respectively provided in the memory card 11 and the hard disk unit 12, and the stored discrimination data may be read out so that the kind of the recording medium can be detected.

The recording-medium discrimination flag is set according to the result of the discrimination executed in Step S331 (Step S332 or S333).

If the memory card 11 is connected to the connector 13 of the camera body, the state of the write protection 18 is read through the interface 10 and the connector 13 as well as the connector 17 and the interface 16 of the memory card 11 (Step S334). If the write protection 18 is set, the protection flag is set (Step S335), and the recording-medium detecting operation is brought to an end. If it is determined in Step S334 that the write protection 18 is not set, the recording-medium detecting operation is brought to an end in Step S334. The recording-medium detecting processing executed in Step S304 of FIG. 14 is as described above.

Figure 17:
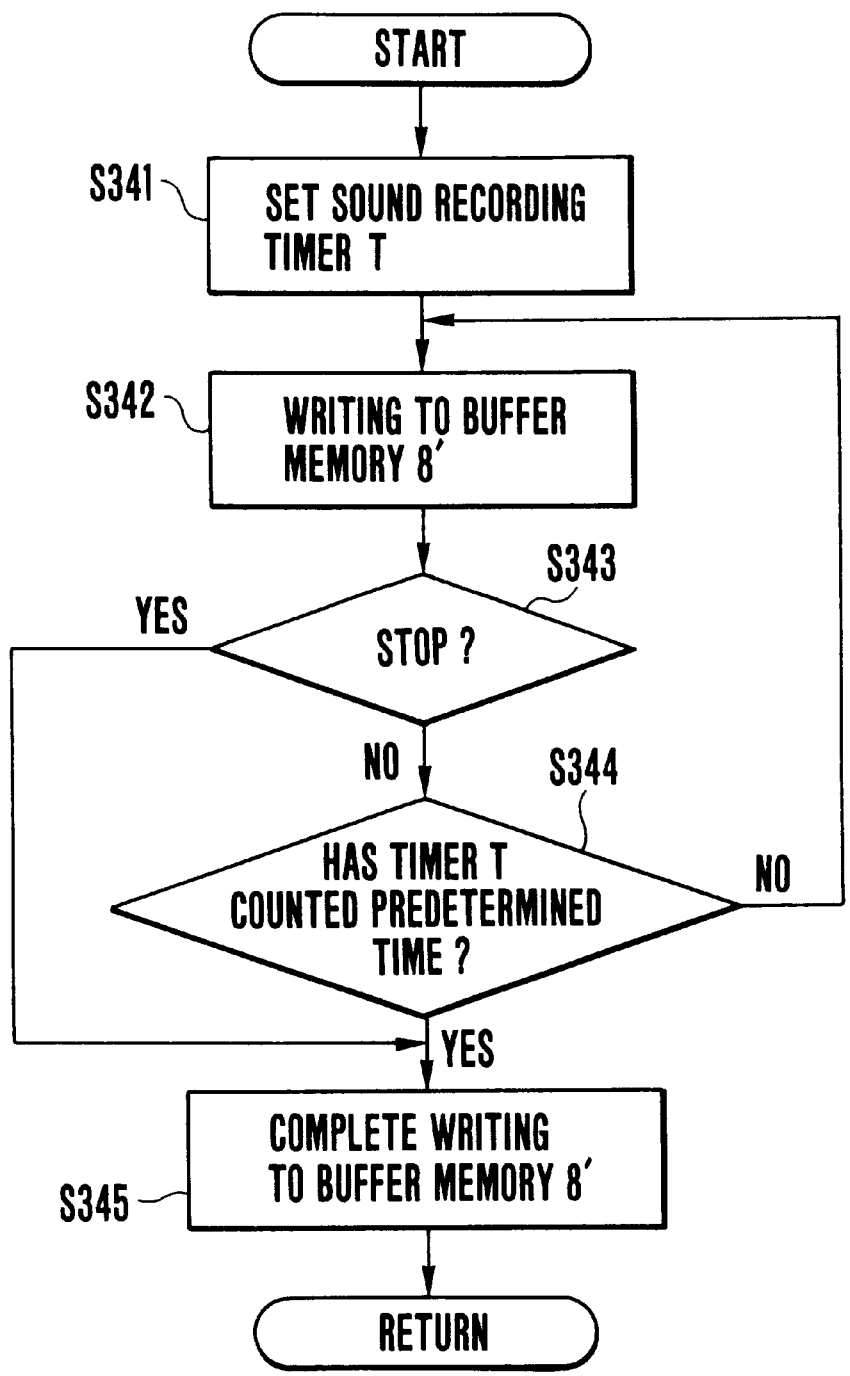
FIG. 17 is a flowchart of a sound recording routine according to the fourth embodiment.

The sound recording operation executed in Step S321 of FIG. 15 will be described below with reference to the flowchart of FIG. 17.

When the sound-recording executing switch 49 is operated, the sound-recording time of a sound-recording timer T is set to a predetermined time (Step S341), and sound data. outputted from the microphone 51 is subjected to signal processing which is set according to the kind of the recording medium, and the processed sound data is temporarily stored in the buffer memory 8' (Step S342). The writing of the sound data into the buffer memory 8' is continued until the sound recording is forcedly stopped from the outside (Step S343) or until the timer T counts the predetermined time (Step S344). If the sound recording is forcedly stopped before the timer T counts the predetermined time (Step S343) or if the timer T counts the predetermined time (Step S344), the writing of the sound data into the buffer memory 8' is automatically completed (Step S345), thereby bringing the sound recording operation to an end. The sound recording processing executed in Step S321 of FIG. 15 is as described above.

An electronic still camera according to a fifth embodiment of the present invention will be described in detail below with reference to the associated drawings.

Figure 18:
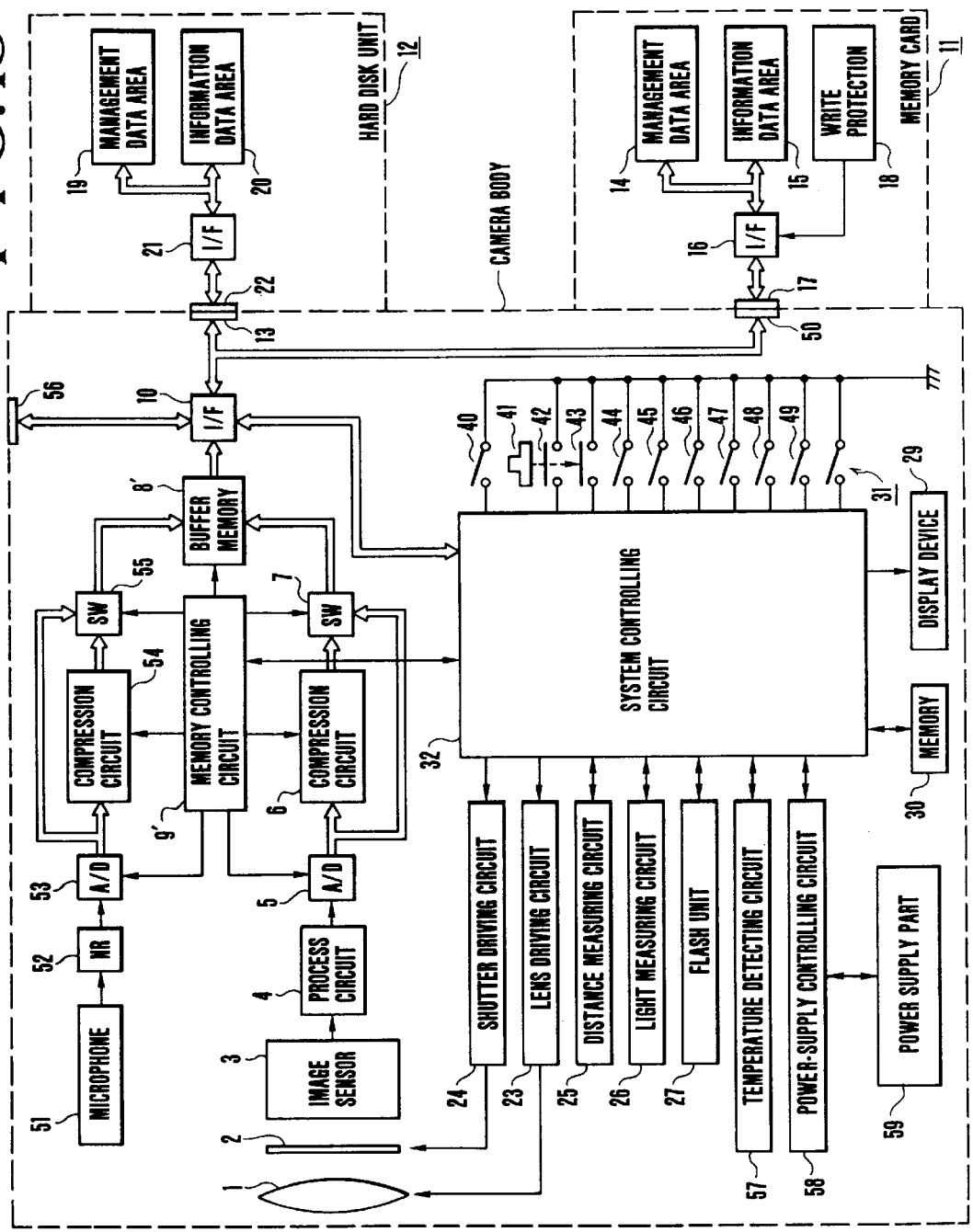
FIG. 18 is a block diagram of an electronic still camera according to a fifth embodiment of the present invention.

FIG. 18 is a block diagram of the electronic still camera according to the fifth embodiment of the present invention. In FIG. 18, the same reference numerals are used to denote elements which are substantially identical to those shown in FIG. 7 or 13, and description thereof is omitted for the sake of simplicity.

The electronic still camera according to the fifth embodiment has a camera body further provided with the connector 50, which is substantially identical to the connector 13, so that two recording media in which photographed-image data and other data are to be recorded can be simultaneously attached to the camera body.

The operational control of the electronic still camera according to the fifth embodiment will be described in detail below with reference to FIGS. 15 and 18 to 20.

Figure 19:
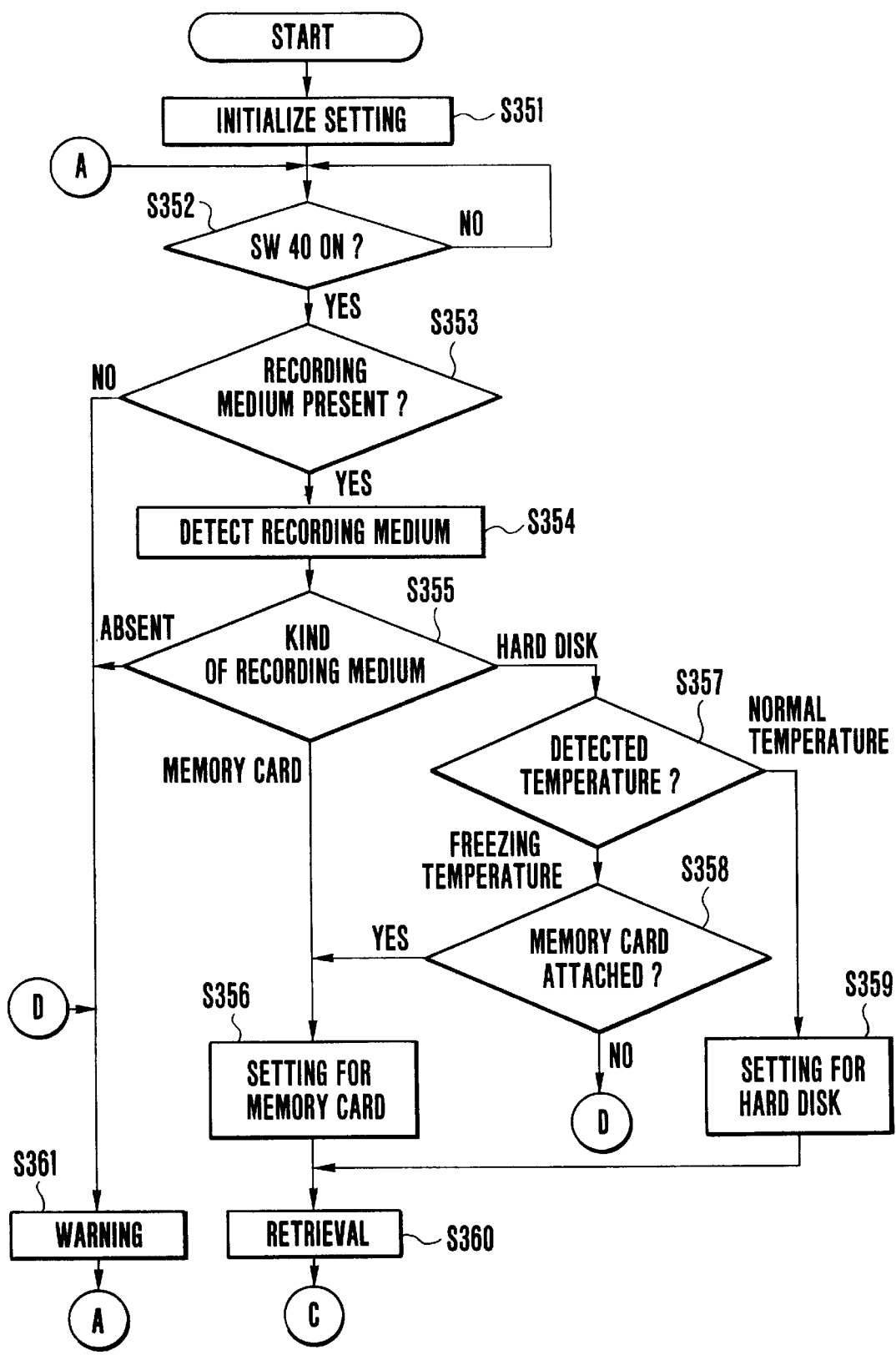
FIG. 19 is a partial flowchart of a main routine according to the fifth embodiment.
Figure 20:
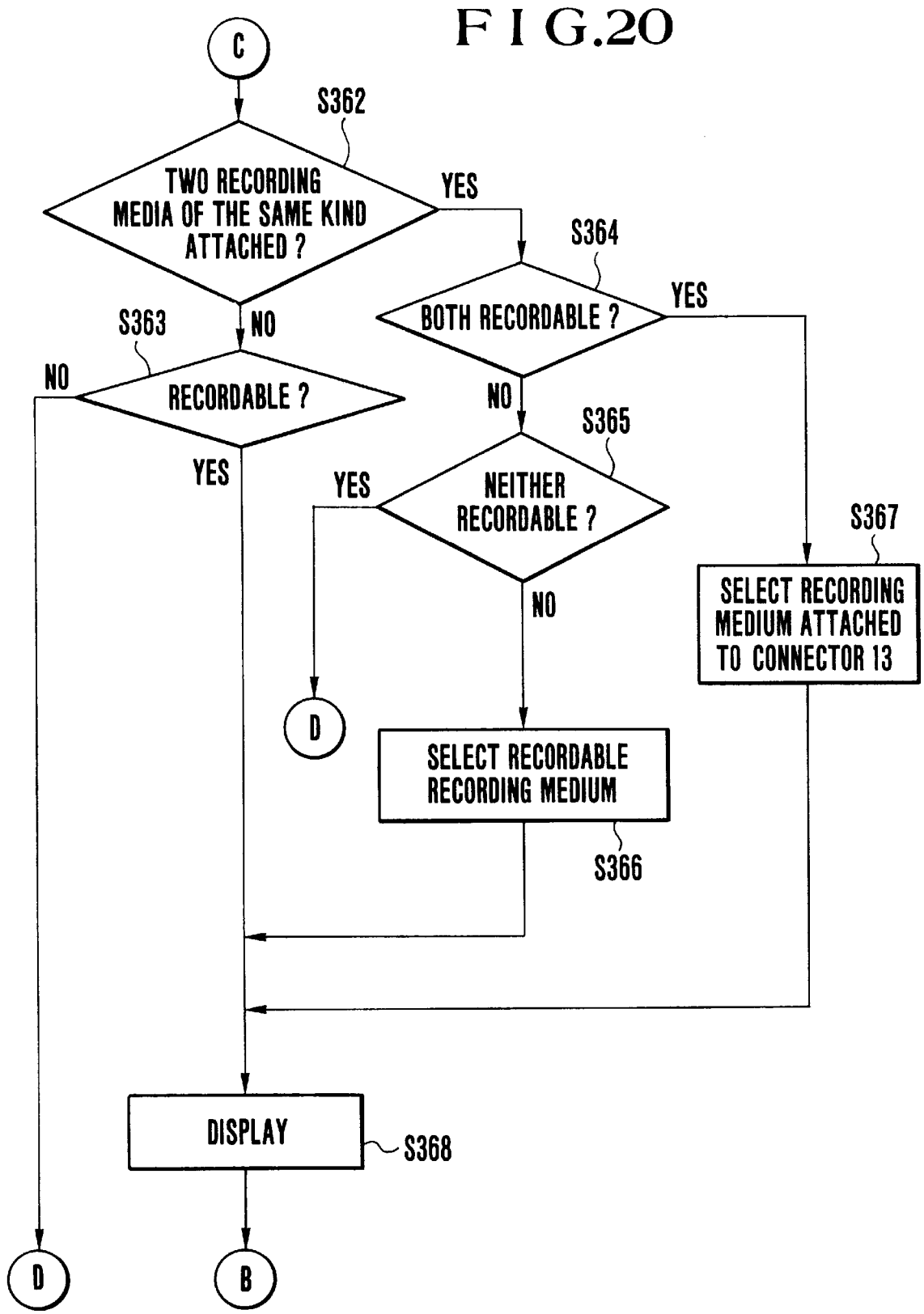
FIG. 20 is a partial flowchart of the main routine according to the fifth embodiment.

FIGS. 19 and 20 are flowcharts showing a main routine which is followed by the electronic still camera according to the fifth embodiment.

Referring to FIG. 19, when the power supply part 59 is turned on, the system controlling circuit 32 initializes the flags, the control variables and so on (Step S351). When the main switch 40 is closed (Step S352), it is determined whether the recording medium is connected to the connector 13 or 50 (Step S353).

If it is determined that no recording medium is attached to the camera body, a warning is displayed on the display device 29 (Step S361) and the flow returns to Step 352.

If it is determined that the recording medium is attached to the camera body (Step S353), detection is made to discriminate the kind of the attached recording medium (Step S354). The recording-medium discrimination detection made in Step S354 is similar to that explained with reference to the flowchart of FIG. 16 in connection with the fourth embodiment.

Then, it is determined which of the memory card 11 and the hard disk unit 12 is presently set as a selected recording medium on the camera side, and it is detected whether the set recording medium is attached to the camera body (Step S355).

If no set recording medium is detected in step S355, a warning is displayed on the display device 29 (Step S361) and the flow returns to Step S352.

If the memory card 11 is set as the selected recording medium, the settings that are associated with the control variables, the operating mode, the display mode and the like are switched according to the memory card 11 which is the connected recording media (Step S356).

If the hard disk unit 12 is set as the selected recording medium in Step 355, the temperature detecting circuit 57 is made to measure the temperature of the hard disk unit 12 and a decision is made as to the presence or absence of a dew condensation or a freeze (Step S357).

If it is determined that the dew condensation or the freeze has occurred, it is determined whether the memory card 11 is attached to the camera body. If the memory card 11 is attached, the selected recording medium is switched to the memory card 11 (Step S358). If the memory card 11 is not attached, the flow proceeds to Step S361.

If it is determined in Step S357 that neither the dew condensation nor the freeze has occurred in the hard disk unit 12, the settings that are associated with the control variables, the operating mode, the display mode and so on are switched according to the hard disk unit 12 which is the connected recording medium (Step S359).

Since the contents of the processing of Step S356 and S359 are similar to those described above in connection with the fourth embodiment, description thereof is omitted for the sake of simplicity.

Then, retrieval of management data about the recording media attached to the camera body is performed (Step S360). Such retrieval is performed with respect to each of the recording media attached to the camera body. After the retrieval has been completed, the flow proceeds to Step S362 of FIG. 20.

Then, it is determined whether the recording medium set as the selected recording medium in Step S355 is connected to each of the connectors 13 and 50 (Step S362).

If the recording medium is only connected to either one of the connectors 13 and 50, it is determined whether a recordable empty area is present in the connected recording medium (Step S363). If there is no recordable empty area, the flow returns to Step S361 of FIG. 19.

If it is determined in Step S363 that a recordable empty area is present, the number of remaining recordable or recorded exposures, the date of photography, the selected operating mode and so on are visually displayed on the basis of the management data, the various kinds of modes set by the switch group 31 and the mode settings switched according to the recording-medium discrimination flag (Step S368).

If it is determined in Step S362 that the recording medium which has been set as the selected recording medium in Step S355 is connected to each of the connectors 13 and 50, it is determined whether both recording media are recordable (whether empty areas are present in the information data areas of the respective recording media) (Step S364). If both recording media are recordable, the recording medium connected to the connector 13 is automatically selected (Step S367) and the flow proceeds to Step S368. Although not described herein, it is also possible to adopt an arrangement which allows the photographer to manually input a request to select the desired one of the recording media connected to the connectors 13 and 50 by operating an operating switch or the like provided on the camera body.

If it is not determined in Step S364 that both of the recording media are recordable, it is determined whether neither of the recording media is recordable (Step S365). If it is determined that neither of them is recordable, the flow proceeds to Step S361 of FIG. 19.

If it is not determined in Step S365 that neither of the recording media is recordable, the recordable recording medium is automatically selected (Step S366), and the number of remaining recordable or recorded exposures, the date of photography and the selected operating mode are visually displayed on the basis of the management data, the various kinds of modes set by the switch group 31 and the mode settings switched according to the recording-medium discrimination flag, and, in addition, a visual display indicating that the nonrecordable recording medium is also connected is provided (Step S368).

The flow proceeds from Step S368 to the connection symbol B in the flowchart of FIG. 15 which has been described above in connection with the fourth embodiment. In the description of the operation of the fifth embodiment, the flow shown in FIG. 15 proceeds from the connection symbol A to the connection symbol A (Step S352) shown in FIG. 19.

An electronic still camera according to a sixth embodiment of the present invention will be described below with reference to the associated drawings.

Since the arrangement of the electronic still camera according to the sixth embodiment is similar to that of the electronic still camera according to the fifth embodiment, description thereof is omitted for the sake of simplicity (refer to FIG. 18).

The operational control of the electronic still camera according to the sixth embodiment will be described in detail below with reference to FIGS. 21 and 22.

Figure 21:
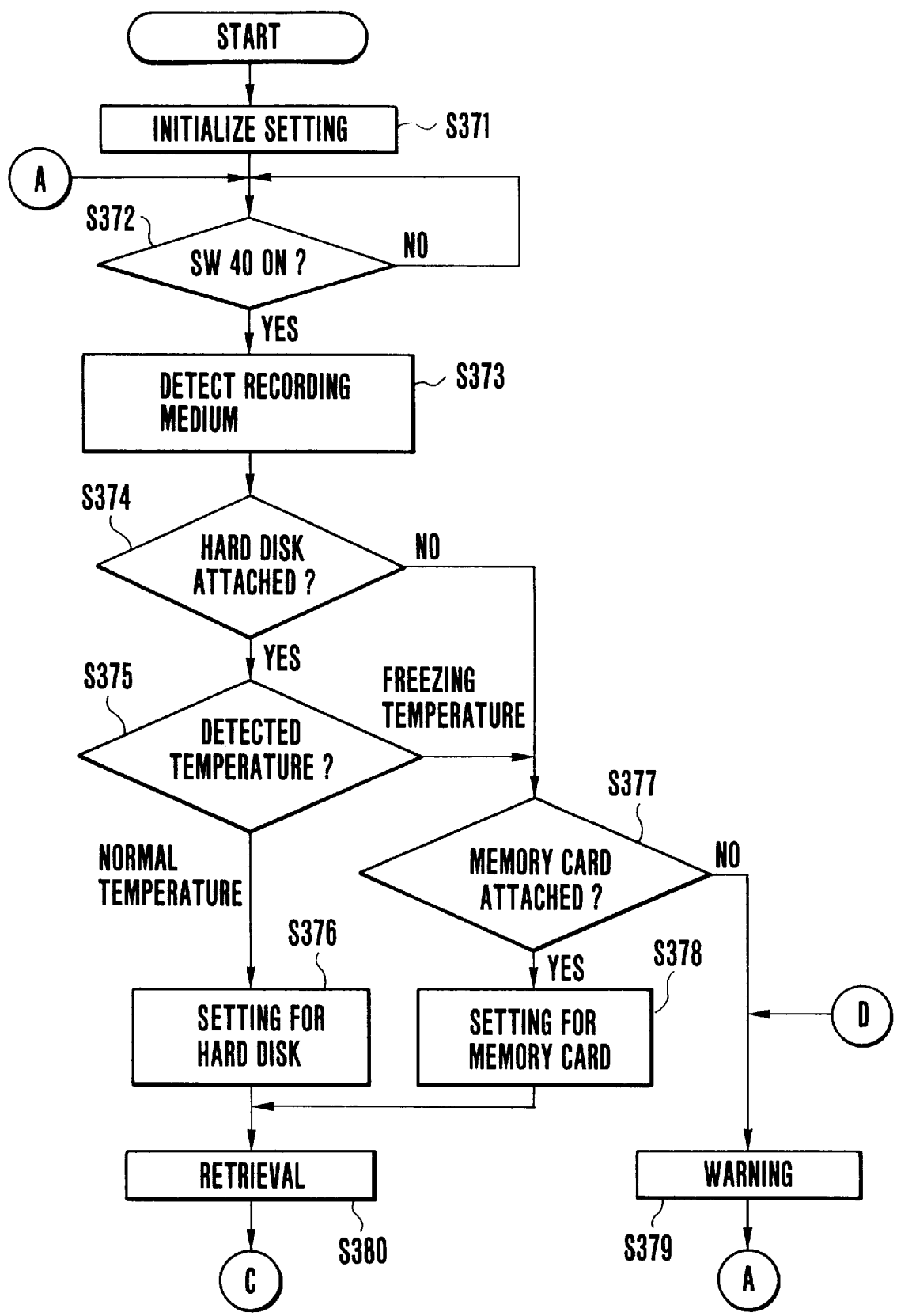
FIG. 21 is a partial flowchart of a main routine according to a sixth embodiment.
Figure 22:
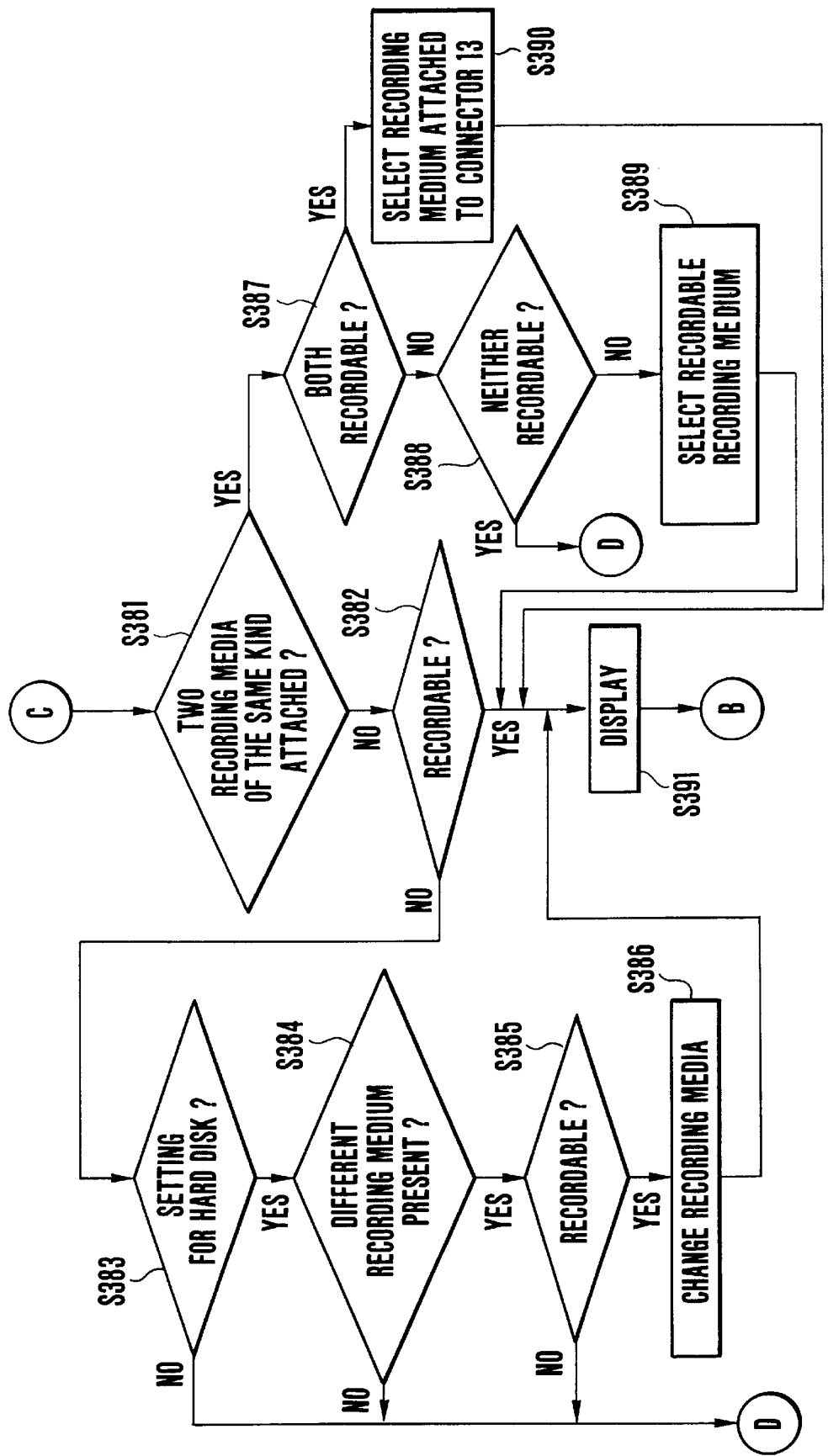
FIG. 22 is a partial flowchart of the main routine according to the sixth embodiment.

FIGS. 21 and 22 are flowcharts showing a main routine which is followed by the electronic still camera according to the sixth embodiment.

Referring to FIG. 21, when the power supply part 59 is turned on, the system controlling circuit 32 initializes the flags, the control variables and so on (Step S371). When the main switch 40 is closed (Step S372), detection is made to discriminate the kind of each attached recording medium (Step S373). The recording-medium discrimination detection made in Step S373 is similar to that explained with reference to the flowchart of FIG. 16 in connection with the fourth embodiment. The recording-medium discrimination detection is made as to all the recording media attached to the camera body.

Then, it is determined whether the hard disk unit 12 is attached to the camera body on the basis of the result of the recording-medium discrimination detection executed in Step S373 (Step S374). If it is determined that the hard disk unit 12 is attached, the temperature detecting circuit 57 is made to measure the temperature of the hard disk unit 12 and a decision is made as to the presence or absence of a dew condensation or a freeze (Step S375).

If it is determined that the dew condensation or the freeze has occurred, the flow proceeds to Step S377.

If it is determined in step S375 that neither the dew condensation nor the freeze has occurred, the settings that are associated with the control variables, the operating mode, the display mode and so on are switched according to the hard disk unit 12 which is the connected recording medium (Step S376).

If it is determined in Step S374 that the recording medium is not attached, it is determined whether the memory card 11 is attached to the camera body (step S377). If the memory card 11 is attached, the settings are switched to those for the memory card 11 (Step S378). If the memory card 11 is not attached, a warning indicative of an instruction to attach the recording medium is displayed on the display device 29 (Step S379), and the flow returns to Step S372.

The contents of the processing of Step S376 and S378 are similar to those described above in connection with the fourth embodiment.

Then, retrieval of management data about the recording media attached to the camera body is performed (Step S380). Such retrieval is performed with respect to each of the recording media attached to the camera body. After the retrieval has been completed, the flow proceeds to Step S381 of FIG. 22.

Then, it is determined whether the recording medium set as the selected recording medium in Step S355 is connected to each of the connectors 13 and 50 (Step S381).

If the recording medium is only connected to either one of the connectors 13 and 50, it is determined whether a recordable empty area is present in the connected recording medium (Step S382). If a recordable empty area is present, the number of remaining recordable or recorded exposures, the date of photography, the selected operating mode and so on are visually displayed on the basis of the management data, the various kinds of modes set by the switch group 31 and the mode settings switched according to the recording-medium discrimination flag (Step S391).

If it is determined in Step S382 that the attached recording medium is nonrecordable, it is determined whether settings for the hard disk unit 12 are selected as the settings for the recording medium of the electronic still camera (Step S383). If no settings for the hard disk unit 12 are selected, the flow proceeds to Step S379 of FIG. 21 and a warning indicative of an instruction to replace the attached recording medium is displayed.

If the settings for the hard disk unit 12 are selected, it is determined whether the memory card 11 is attached (Step S384).

If the memory card 11 is not attached, the flow proceeds to Step S379 of FIG. 21 and a warning indicative of an instruction to replace the attached recording medium is displayed.

If the memory card 11 is attached, it is determined whether the attached memory card 11 is recordable (Step S385).

If it is determined that the memory card 11 is recordable, the flow proceeds to Step S379 of FIG. 21 and a warning indicative of an instruction to replace the attached recording medium is displayed.

If it is determined in Step S385 that the memory card 11 is recordable, the settings are switched to those for the memory card 11 (step S386), and the number of remaining recordable or recorded exposures, the date of photography and the selected operating mode are visually displayed on the basis of the management data, the various kinds of modes set by the switch group 31 and the mode settings switched according to the recording-medium discrimination flag (Step S391).

If it is determined in Step S381 that the recording medium which has been set as the selected recording medium in Step S355 is connected to each of the connectors 13 and 50, it is determined whether the recording media connected to both of the connectors 13 and 50 are recordable (Step S387).

If it is determined in Step S387 that both recording media are recordable, the recording medium connected to the connector 13 is automatically selected (Step S390), and the number of remaining recordable or recorded exposures, the date of photography and the selected operating mode are visually displayed on the basis of the management data about the selected recording medium, the various kinds of modes set by the switch group 31 and the mode settings switched according to the recording-medium discrimination flag (Step S391). Although not described herein, it is also possible to adopt an arrangement which allows the photographer to manually input a request to select the desired one of the recording media connected to the connectors 13 and 50 by operating an operating switch or the like provided on the camera body.

If it is not determined in Step S387 that both of the recording media are recordable, it is determined whether neither of the recording media is recordable (Step S388). If it is determined that neither of them is recordable, the flow proceeds to Step S379 of FIG. 21, where a warning display which indicates that neither of them is recordable is provided and a display which indicates an instruction to replace the attached recording media is also provided.

If it is not determined in Step S388 that neither of the recording media is recordable, the recordable recording medium is automatically selected (Step S389), and the number of remaining recordable or recorded exposures, the date of photography and the selected operating mode are visually displayed on the basis of the management data, the various kinds of modes set by the switch group 31 and the mode settings switched according to the recording-medium discrimination flag, and, in addition, a visual display indicating that the nonrecordable recording medium is also connected is provided (Step S391).

The flow proceeds from Step S391 to the connection symbol B in the flowchart of FIG. 15 which has been described above in connection with the fourth embodiment. In the description of the operation of the sixth embodiment, the flow shown in FIG. 15 proceeds from the connection symbol A to the connection symbol A (Step S372) shown in FIG. 21.

An electronic still camera according to a seventh embodiment of the present invention will be described below with reference to the associated drawings.

Since the arrangement of the electronic still camera according to the seventh embodiment is similar to that of the electronic still camera according to the fifth embodiment, description thereof is omitted for the sake of simplicity (refer to FIG. 18).

The operational control of the electronic still camera according to the seventh embodiment will be described in detail below with reference to FIGS. 23 and 24.

Figure 23:
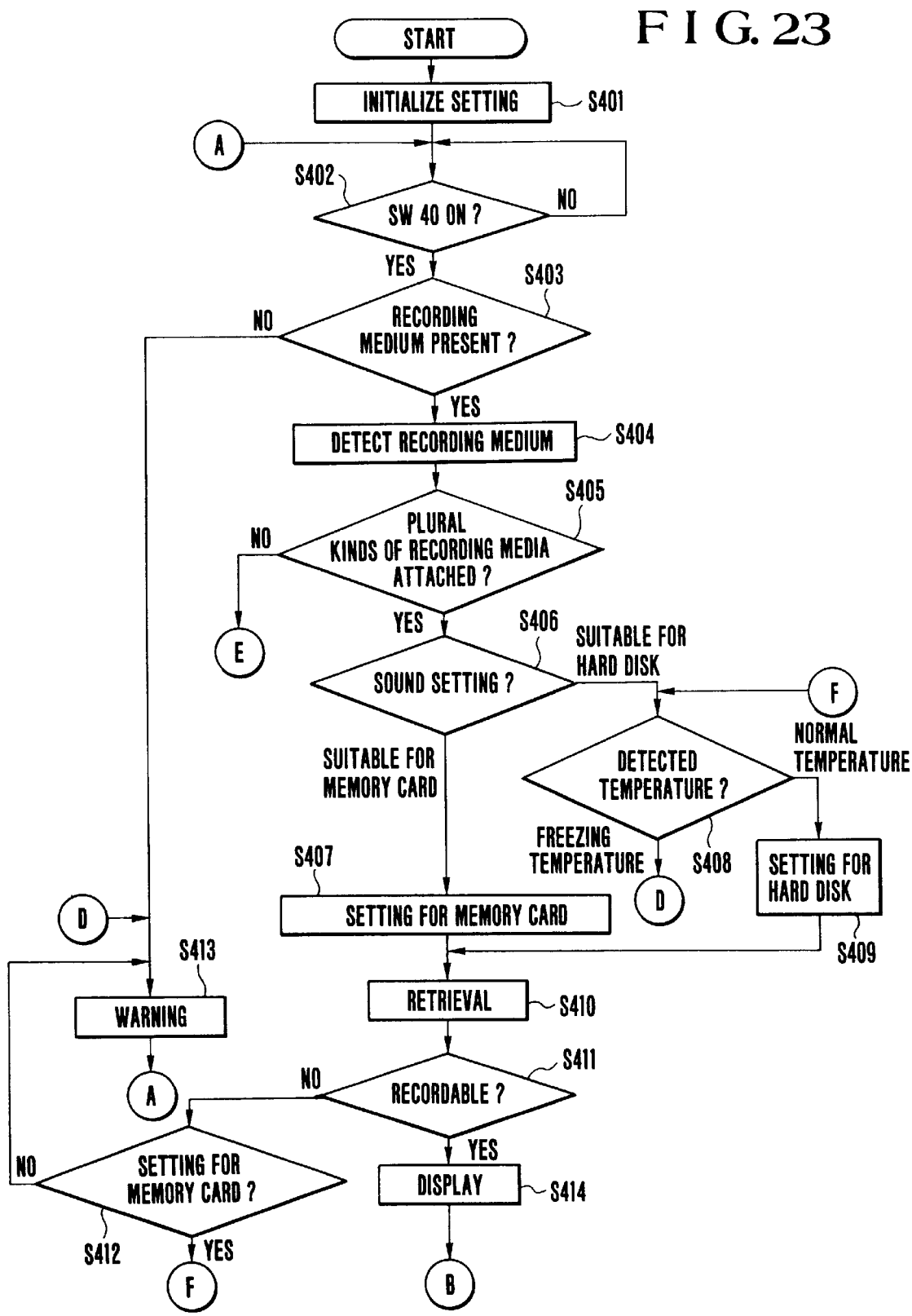
FIG. 23 is a partial flowchart of a main routine according to a seventh embodiment.

FIGS. 23 and 24 are flowcharts showing a main routine which is followed by the electronic still camera according to the seventh embodiment.

Referring to FIG. 23, when the power supply part 59 is turned on, the system controlling circuit 32 initializes the flags, the control variables and so on (Step S401). When the main switch 40 is closed (Step S402), it is determined whether the recording medium is attached to the camera body (Step S403).

If it is determined that no recording medium is attached to the camera body, a warning is displayed on the display device 29 (Step S413) and the flow returns to Step S402.

If the recording medium or media are attached to the camera body, the recording-medium discrimination detection is made as to each of the attached recording media (Step S404). The recording-medium discrimination detection made in Step S404 is similar to that explained with reference to the flowchart of FIG. 16 in connection with the fourth embodiment. The recording-medium discrimination detection is made as to all the recording media attached to the camera body.

Then, it is determined whether a plurality of recording media having different recording forms are attached to the camera body, on the basis of the recording-medium discrimination detection made in Step S404 (Step S405). In the seventh embodiment, it is determined whether both the memory card 11 and the hard disk unit 12 are attached to the camera body.

If it is determined that both are attached to the camera body, the flow proceeds to Step S406, where the system controlling circuit 32 selects an optimum recording medium in accordance with the setting of a sound (recording) function.

One example of a method for selecting the recording medium makes use of the on-off state of the sound recording function. If the sound recording function is on, the hard disk unit 12 is selected, while if it is off, the previously selected recording medium, which is either one of the hard disk unit 12 and the memory card 11, is used.

If an image and a sound are to be recorded, the hard disk unit 12 is selected which has a recording capacity greater than the memory card 11.

If the sound-recording time of each image for one exposure is set to a relatively long time, the hard disk unit 12 is selected, while if it is set to a relatively short time, the previously selected recording medium, which is either one of the hard disk unit 12 and the memory card 11, is used.

If the compression ratio of sound is set to a relatively low ratio, the previously selected recording medium, which is either one of the hard disk unit 12 and the memory card 11, is used.

In addition, if a sound-compression method which is advantageous in terms of reversibility is set, the hard disk unit 12 is selected, while if a sound-compression method which is advantageous in terms of compression efficiency is set, the previously selected recording medium which is either one of the hard disk unit 12 and the memory card 11, is used.

The above-described recording-medium selecting method assumes that the hard disk unit 12 has an available memory capacity greater than the memory card 11. However, since the hard disk unit 12 does not necessarily have an available memory capacity greater than the memory card 11, in the processing of Step S406, it is more preferable to detect the respective available memory capacities of the hard disk unit 12 and memory card 11 and select the suitable one on the basis of the result of the detection.

If it is determined that the memory card 11 is suitable for use as the recording medium, from the state of the sound function detected in Step S406, the settings that are associated with the control variables, the operating mode, the display mode and so on in the camera body are switched according to the memory card 11 (Step S407).

If it is determined that the hard disk unit 12 is suitable for use as the recording medium, from the state of the sound function detected in Step S406, the temperature detecting circuit 57 is made to measure the temperature of the hard disk unit 12 and a decision is made as to the presence or absence of a dew condensation or a freeze (Step S408).

If it is determined that the dew condensation or the freeze has occurred, the flow proceeds to Step S413.

If it is determined in Step S408 that neither the dew condensation nor the freeze has occurred, the settings that are associated with the control variables, the operating mode, the display mode and so on are switched according to the hard disk unit 12 (Step S409).

Since the contents of the processing of Step S407 and S409 are similar to those described above in connection with the fourth embodiment, description thereof is omitted for the sake of simplicity.

After Step S407 or S409 has been completed, retrieval of management data about the selected recording medium is performed (Step S410).

Then, it is determined whether the selected recording medium is recordable (Step S411).

If it is determined that the selected recording medium is nonrecordable, it is determined whether the present settings are those for the memory card 11 (Step S412). If no settings for the memory card 11 are selected, a warning indicative of an instruction to replace the selected recording medium is displayed and the flow proceeds to Step S402.

If it is determined in Step S412 that the settings for the memory card 11 are selected, the flow returns to Step S408.

If it is determined in Step S411 that the memory card 11 is recordable, the number of remaining recordable or recorded exposures, the date of photography and the selected operating mode are visually displayed on the basis of the management data, the various kinds of modes set by the switch group 31 and the mode settings switched according to the recording-medium discrimination flag (Step S414). The flow proceeds to the connection symbol B in the flowchart of FIG. 15 which has been described above in connection with the fourth embodiment.

In the description of the operation of the seventh embodiment, the flow shown in FIG. 15 proceeds from the connection symbol A to the connection symbol A (Step S402) shown in FIG. 23.

The following description is made in connection with processing which is executed if it is determined in Step S405 that a plurality of recording media having different recording forms are not attached to the camera body.

In this case, the flow proceeds to Step S415 of FIG. 24, where it is determined whether two recording media of the same kind (having the same recording form) are attached to the camera body. If two recording media of the same kind are not attached to the camera body, the flow proceeds to Step S416, where the setting of the sound (recording) function is detected so that it is determined which of the hard disk unit 12 and the memory card 11 is suitable for use as the recording medium. The decision method is similar to the above-described processing of Step S406.

If it is determined that the memory card 11 is suitable, it is determined whether the memory card 11 is attached to the camera body (Step S417). If the memory card 11 is attached, control corresponding to the settings for the memory card 11 is selected.

If it is determined in Step S417 that the memory card 11 is not attached, the flow proceeds to Step S420 which will be described later.

If it is determined that the hard disk unit 12 is suitable from the detection of the setting of the sound (recording) function, it is determined whether the hard disk unit 12 is attached to the camera body (Step S419). If the hard disk unit 12 is not attached, the flow proceeds to Step S413 of FIG. 23.

If it is determined in Step S419 that the hard disk unit 12 is attached, the temperature detecting circuit 57 is made to measure the temperature of the hard disk unit 12 and a decision is made as to the presence or absence of a dew condensation or a freeze (Step S420).

If it is determined that the dew condensation or the freeze has occurred, the flow proceeds to Step S413 of FIG. 23.

If it is determined in Step S420 that neither the dew condensation nor the freeze has occurred, the settings that are associated with the control variables, the operating mode, the display mode and so on are switched according to the hard disk unit 12 which is the attached recording medium (Step S421).

After Step S418 or S421 has been completed, retrieval of management data about the selected recording medium is performed (Step S422).

Then, it is determined whether the selected recording medium is recordable (Step S423). If it is determined that the selected recording medium is nonrecordable, the flow returns to Step S413 of FIG. 23.

If the selected recording medium is recordable, the flow proceeds to Step S435, where the number of remaining recordable or recorded exposures, the date of photography and the selected operating mode are visually displayed on the basis of the management data, the various kinds of modes set by the switch group 31 and the mode settings switched according to the recording-medium discrimination flag (Step S435). The flow proceeds to the connection symbol B in the flowchart of FIG. 15 which has been described above in connection with the fourth embodiment.

If two recording media of the same kind (having the same recording form) are not attached to the camera body, the flow proceeds to Step S415, where the setting of the sound (recording) function is detected so that it is determined whether the suitable recording medium is selected in accordance with the result of the detection (Step S424).

If it is determined in Step S424 that the memory card 11 is suitable for use as the recording medium, it is determined whether the memory card 11 is attached to the camera body (Step S425).

If the memory card 11 is attached, control corresponding to the settings for the memory card 11 is selected (Step S426).

If it is determined in Step S425 that the memory card 11 is not attached, the flow proceeds to Step S428 which will be described later.

If it is determined in Step S424 that the hard disk unit 12 is suitable from the detection of the setting of the sound (recording) function, it is determined whether the hard disk unit 12 is attached to the camera body (Step S427).

If the hard disk unit 12 is not attached, the flow proceeds to Step S413 of FIG. 23.

If it is determined in Step S419 that the hard disk unit 12 is attached, the temperature detecting circuit 57 is made to measure the temperature of the hard disk unit 12 and a decision is made as to the presence or absence of a dew condensation or a freeze (Step S428).

If it is determined that the dew condensation or the freeze has occurred, the flow proceeds to Step S413 of FIG. 23, where a warning display which indicates that neither of them is recordable is provided and a display which indicates an instruction to replace the attached recording media is also provided.

If it is determined in Step S428 that neither the dew condensation nor the freeze has occurred in the hard disk unit 12, the settings that are associated with the control variables, the operating mode, the display mode and so on are switched according to the hard disk unit 12 which is the attached recording medium (Step S429).

After step S426 or S429 has been completed, retrieval of management data about the selected recording medium is performed (Step S430).

Then, it is determined whether the attached, two recording media are both recordable (Step S431).

If it is not determined that both of them are recordable, it is determined whether neither of them is recordable (step S432).

If neither is recordable, the flow returns to Step S413 of FIG. 23.

If it is not determined that neither of the recording media is recordable, the recordable recording medium is automatically selected (Step S433), and the number of remaining recordable or recorded exposures, the date of photography and a selected operating mode are visually displayed on the display device 29 on the basis of the management data about the selected recording medium, the various kinds of modes set by the switch group 31 and the mode settings switched according to the recording-medium discrimination flag (Step S435).

If it is determined in Step S431 that the attached, two recording media are recordable, the recording medium connected to the connector 13 is automatically selected and information is recorded in the selected recording medium (Step S434).

Then, the number of remaining recordable or recorded exposures, the date of photography and the selected operating mode are visually displayed on the display device 29 on the basis of the management data about the recording medium selected in Step S434, the various kinds of modes set by the switch group 31 and the mode settings switched according to the recording-medium discrimination flag, and, in addition, a visual display indicating that the nonrecordable recording medium is also connected is provided (Step S435).

The flow proceeds from Step S435 to the connection symbol B in the flowchart of FIG. 15 which has been described above in connection with the fourth embodiment. In the description of the operation of the seventh embodiment, the flow shown in FIG. 15 proceeds from the connection symbol A to the connection symbol A (Step S402) shown in FIG. 23.

The contents of the processing of Steps S407, S409, S418, S421, S426 and S429 are similar to those described above in connection with the first embodiment.

The operational control of the electronic still camera according to the seventh embodiment is as described above.

Figure 25A:
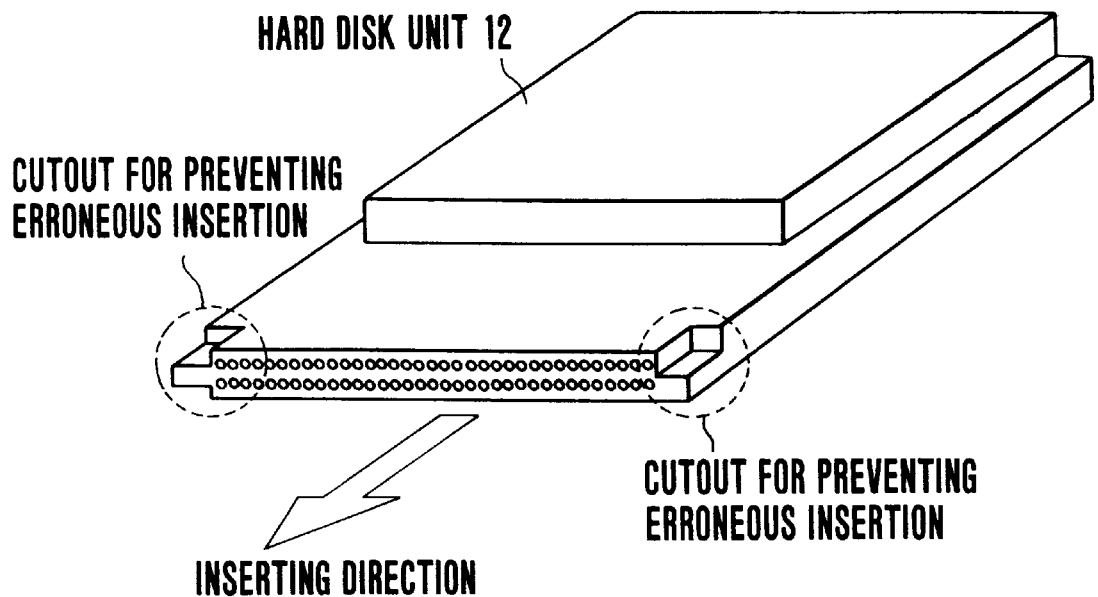
FIGS. 25A and 25B are schematic, perspective views showing the respective external appearances of a hard disk unit and a memory card which are removably attachable to a camera body according to each of the present embodiments.
Figure 25B:
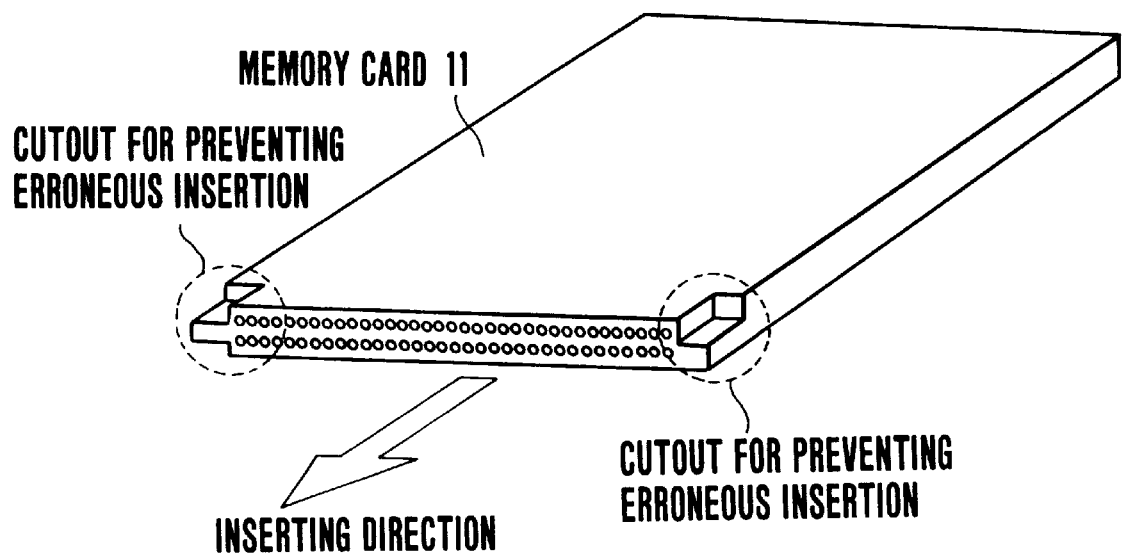

FIGS. 25A and 25B are schematic, perspective views respectively showing specific examples of the external appearances of the hard disk unit 12 and memory card 11 which are used in each of the above-described embodiments. As shown, cutouts for preventing erroneous insertion are provided at opposed ends of the inserting end face of each of the memory card 11 and the hard disk unit 12.

As is apparent from the foregoing description, according to any of the above-described embodiments, it is possible to prevent a failure in recording a photographed image since plural kinds of recording media can be attached to the camera body so that control of a recording operation can be appropriately executed, taking account of a photographic mode associated with photography, the state of an environment in which the electronic still camera is employed, and the kind of a recording medium attached to the camera body of the electronic still camera.

The present invention may be practiced in various other ways without departing from the spirit or essential feature thereof.

For example, although, in the foregoing description of each of the embodiments, reference has been made to the example in which the memory card 11 and the hard disk unit 12 are provided separately from the camera body and can be arbitrarily connected to the camera body, it is apparent that either or both of the memory card 11 and the hard disk unit 12 may be fixed to the camera body.

In the description of each of the first to third embodiments, reference has been made to the example in which if a vibration or a shock is detected during writing to the hard disk unit 12, the continuous shooting is stopped after a single exposure has been performed. However, the continuous shooting may be stopped after the buffer memory 8 has been written up to its maximum memory capacity. As a matter of course, during writing to the memory card 11, it is possible to continue the continuous shooting even if a vibration or a shock is detected.

Figure 12:
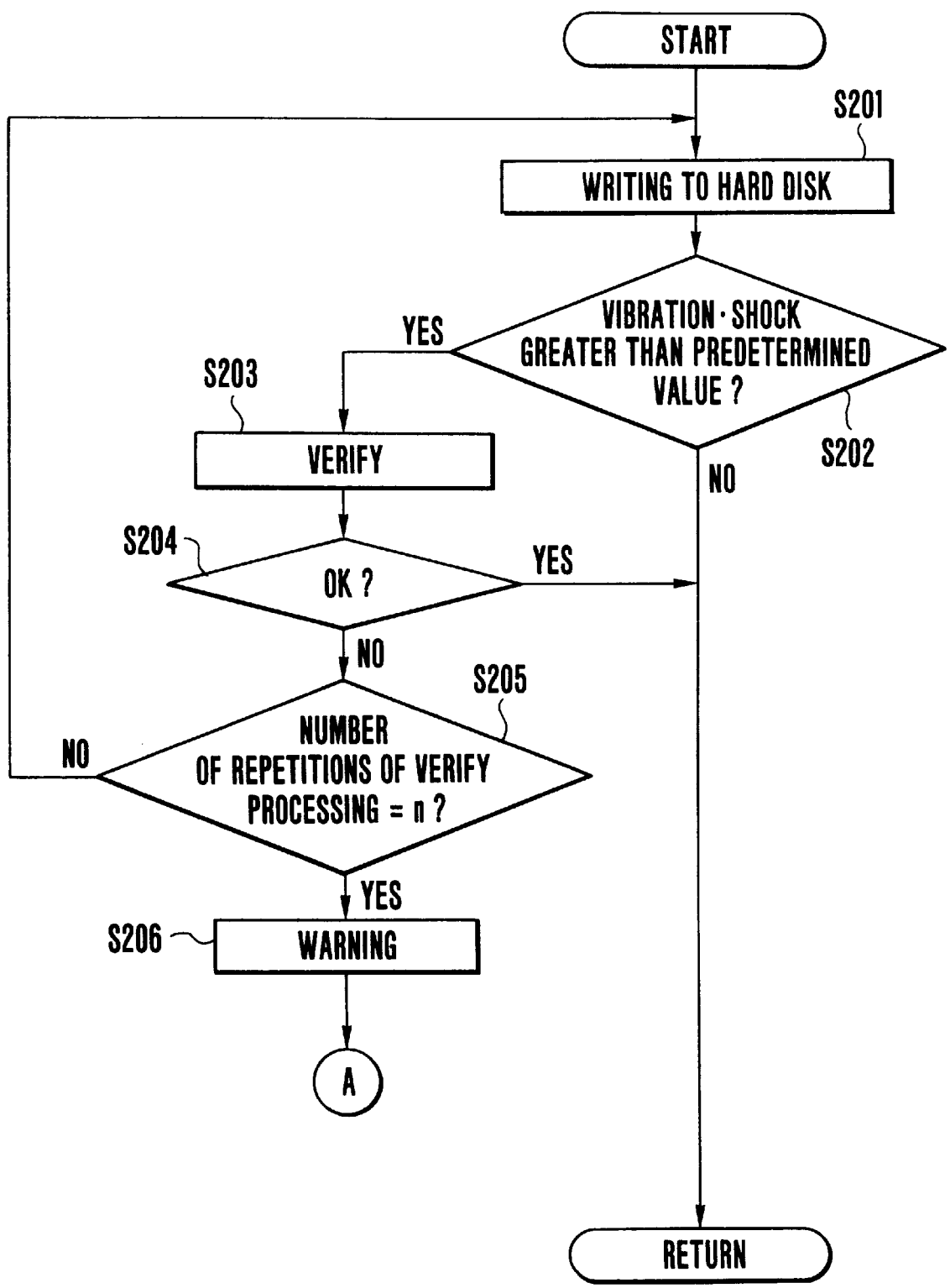
FIG. 12 is a flowchart of a hard-disk writing routine according to the third embodiment.

In Step S22 of FIG. 3, Step S103 of FIG. 10 or Step S206 of FIG. 12, if a vibration or a shock is detected and writing to the hard disk unit 12 is stopped or the writing fails, a warning to that effect is displayed on the display device 29. In addition to the warning, a visual display indicating a request to connect the memory card 11 to the camera body may be provided. If the memory card 11 is connected, image data which was not able to be written into the hard disk unit 12 but which is stored in the buffer memory 8 may be written into the memory card 11.

As is known, the hard disk unit 12 is arranged in such a manner that a magnetic head is made to float by an air flow to keep constant the gap between a magnetic disk and the magnetic head. If atmospheric pressure decreases, the amount of floating of the magnetic head decreases, and the magnetic head and the magnetic disk may come into contact with each other to damage the magnetic disk which is a substantial recording medium.

Figure 29:
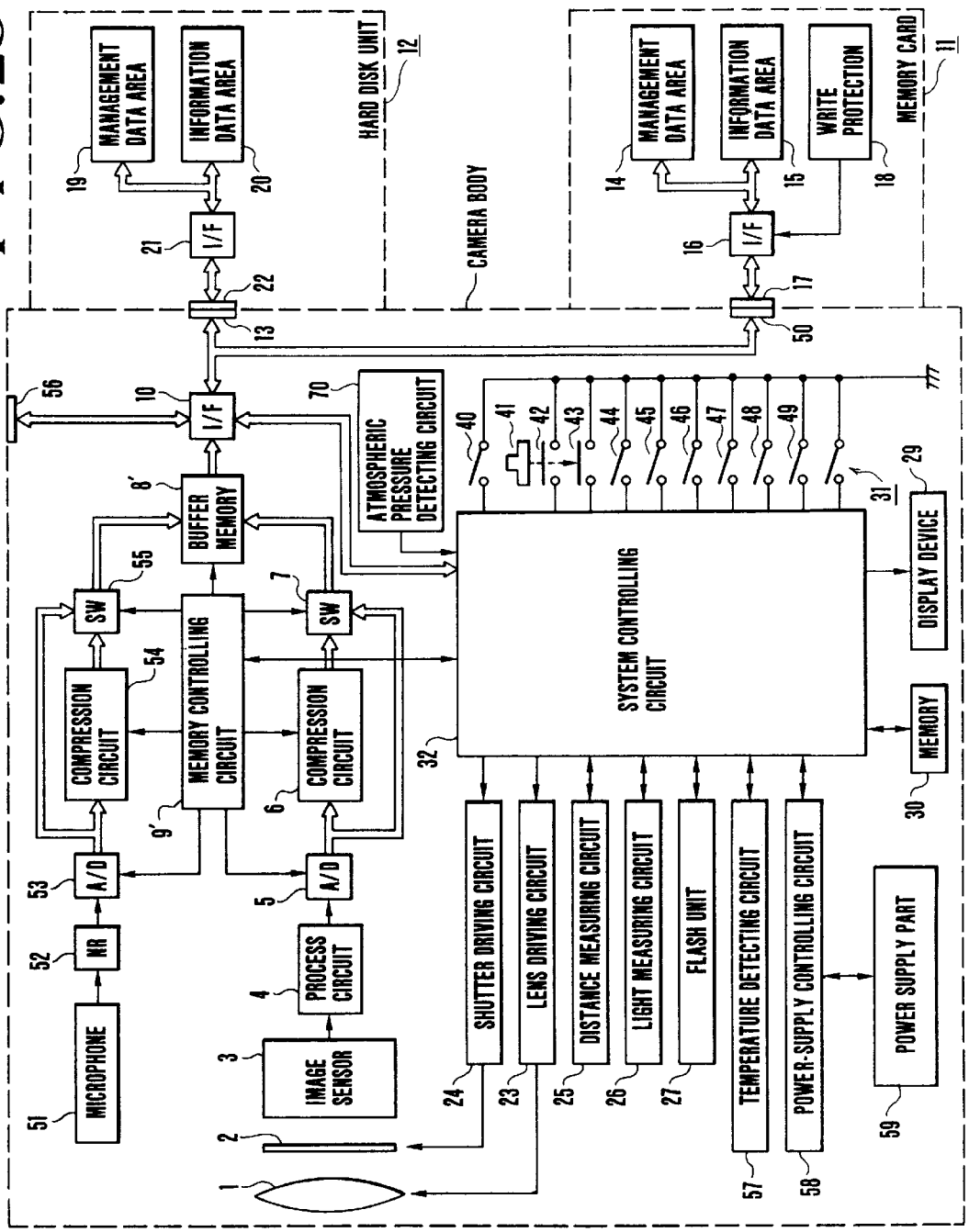
FIG. 29 is a block diagram of an electronic still camera according to an eighth embodiment of the present invention.

To solve this problem, there is provided an electronic still camera according to an eighth embodiment of the present invention. FIG. 29 is a block diagram showing the electronic still camera according to the eighth embodiment. The eighth embodiment shown in FIG. 29 includes, in addition to the above-described constituent elements, an atmospheric pressure detecting circuit 70 for detecting external atmospheric pressure.

The processing operation of the electronic still camera according to the eighth embodiment is achieved by adding atmospheric-pressure detection to the temperature detecting routine in the flowchart referred to in the above description of each of the fifth to seventh embodiments. If a dew condensation or a freeze occurs or if atmospheric pressure is lower than a predetermined value, the processing is executed in such a way that the flow proceeds from Step S357 to step S358 in FIG. 19, or that the flow proceeds from Step S375 to Step S377 in FIG. 21, or that the flow proceeds from Step S408 to Step S413 in FIG. 23, or that the flow proceeds from Step S420 or S428 of FIG. 24 to Step S413 of FIG. 23. The other processing is executed in a manner similar to that described above in connection with each of the embodiments.

In the description of each of the second, third, fifth, sixth and seventh embodiments, reference has been made to the electronic still camera to which two recording media are attachable. Of course, the number of attachable recording media may be three or more.

Figure 26:
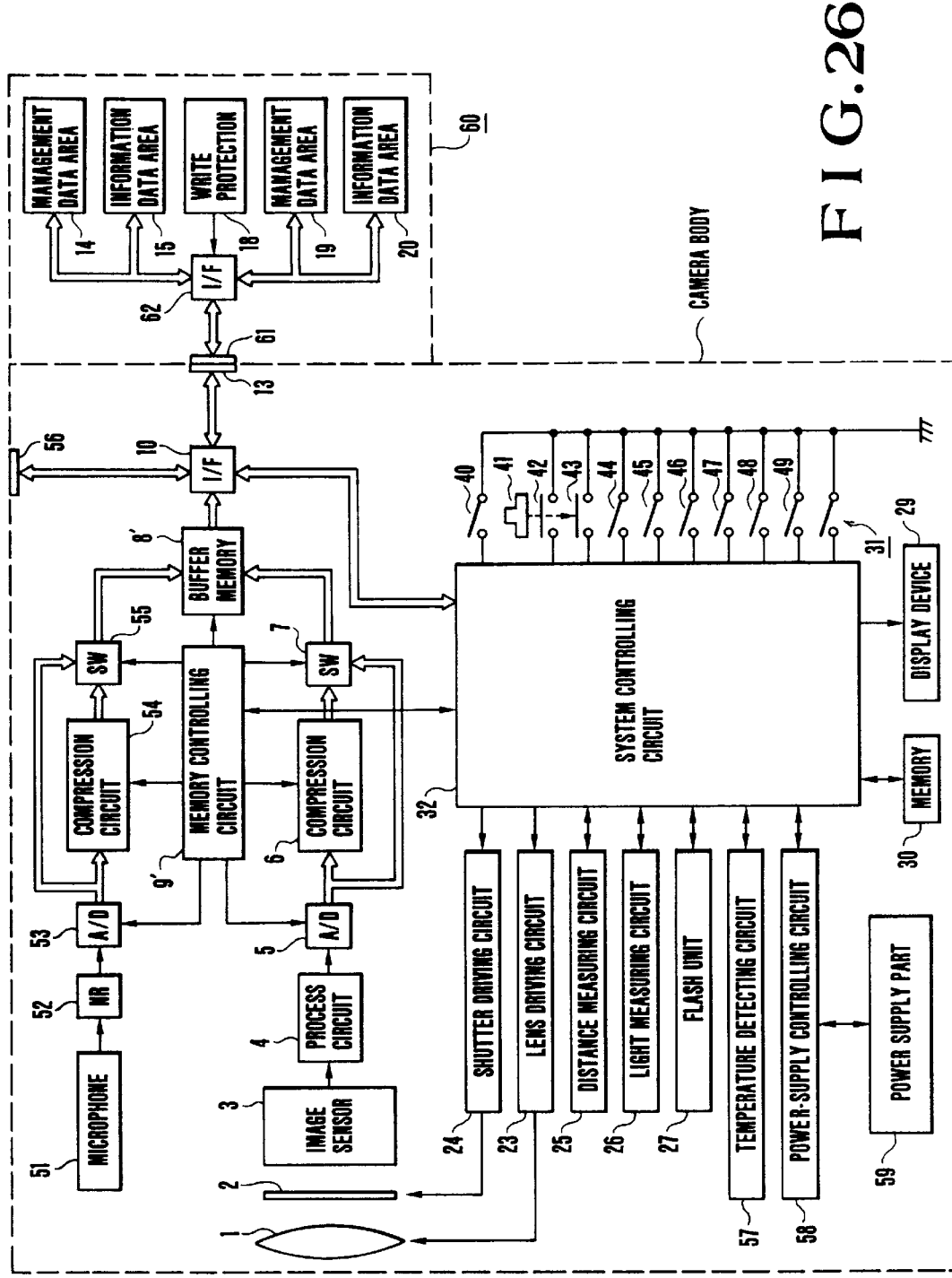
FIG. 26 is a block diagram of another embodiment of the present invention, showing an electronic still camera capable of transmitting data between a camera body and a plurality of recording media.

In the description of each of the second, third, fifth, sixth and seventh embodiments, reference has been made to the electronic still camera which has a camera body provided with two connectors so that two recording media (the memory card 11 and the hard disk unit 12) are attachable. As shown in FIG. 26, a composite recording medium 60 which has a semiconductor recording medium and a hard disk unit in integral form may also be attached to the camera body.

Referring to FIG. 26, a connector 61 provides electrical connection between the composite recording medium 60 and the camera body, and an interface 62 includes constituent elements, such as a control circuit such as a CPU or an MPU, a nonvolatile memory such as a ROM or an EEPROM, and a RAM, and executes control of the composite recording medium 60 on the basis of a predetermined program.

In FIG. 26, the same reference numerals are used to denote elements which are identical or similar to those shown in FIG. 13, and description thereof is omitted for the sake of simplicity.

Figure 27:
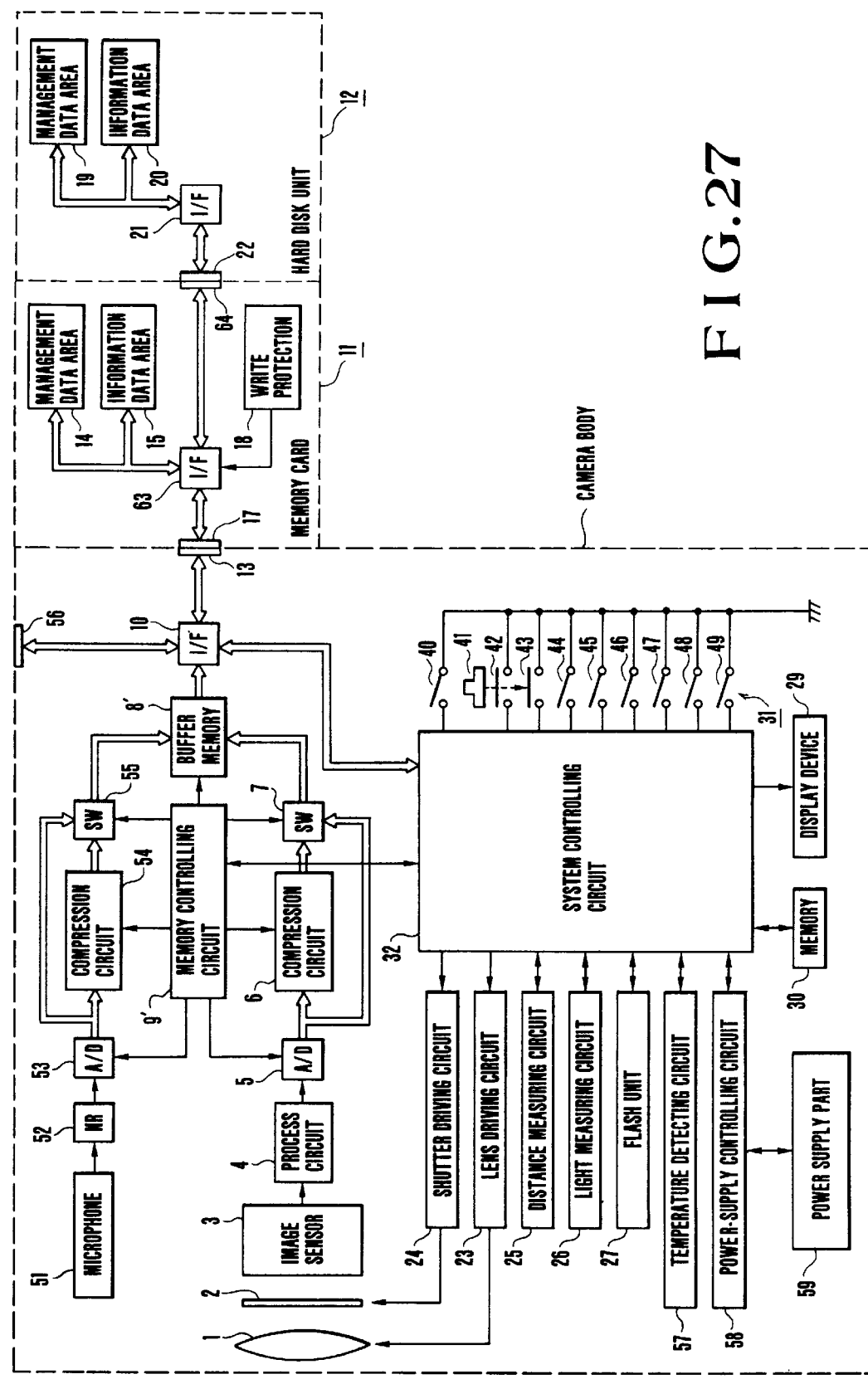
FIG. 27 is a block diagram of another embodiment of the present invention, showing an electronic still camera capable of transmitting data between a camera body and a plurality of recording media.

In addition, to attach a plurality of recording medium to the camera body, the memory card 11 may be provided with a connector 64, as shown in FIG. 27, so that the hard disk unit 12 (or the memory card 11) can be attached thereto.

Which of the recording media should be used is determined by an interface 63 in accordance with a control signal from the camera side.

Figure 28:
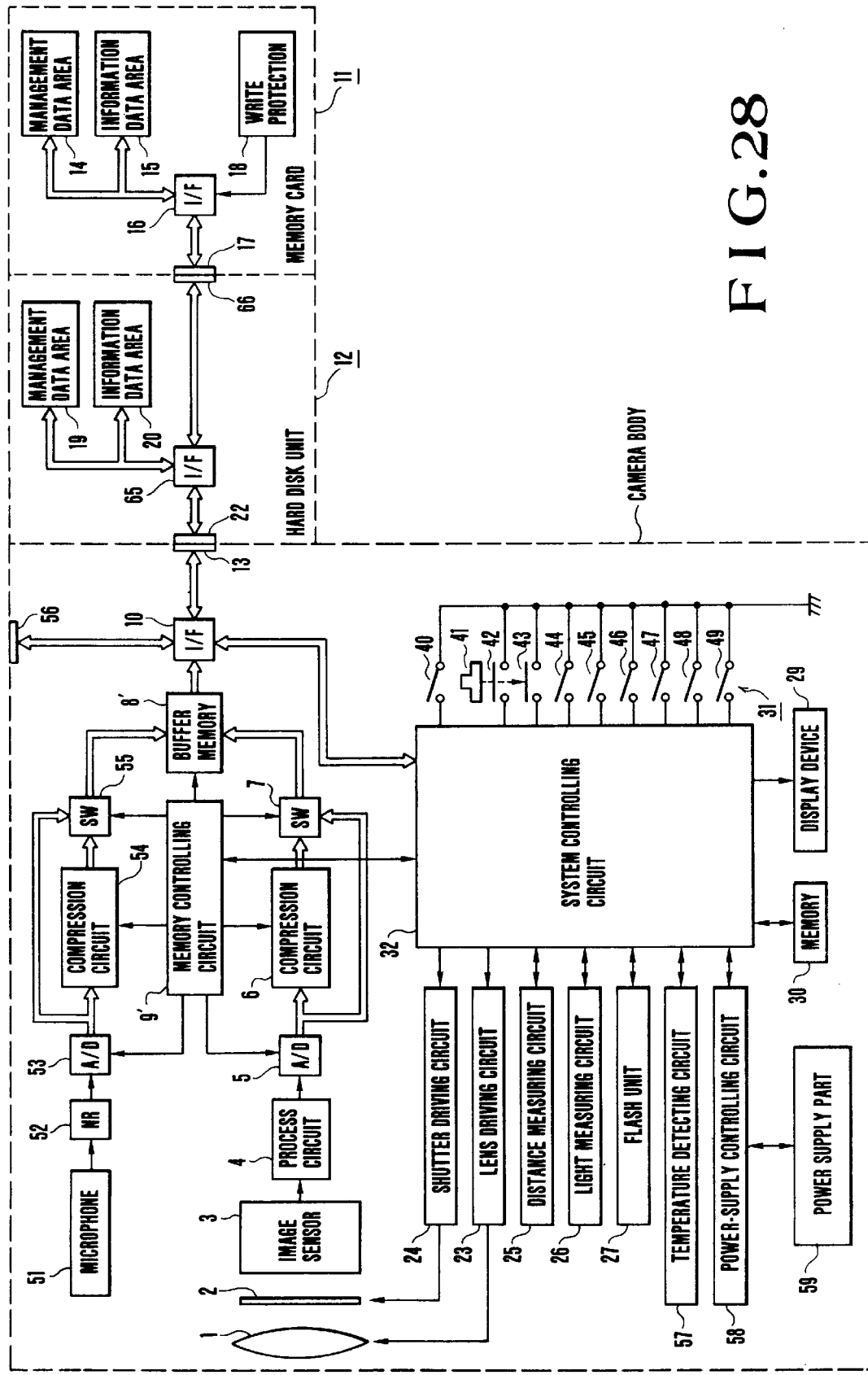
FIG. 28 is a block diagram of another embodiment of the present invention, showing an electronic still camera capable of transmitting data between a camera body and a plurality of recording media.

In addition, the hard disk unit 12 may be provided with a connector 66, as shown in FIG. 28, so that the memory card 11 (or the disk unit 12) can be attached thereto.

Which of the recording media should be used is determined by an interface 65 in accordance with a control signal from the camera side.

In FIGS. 27 and 28, the same reference numerals are used to denote elements which are identical or similar to those shown in FIG. 13, and description thereof is omitted for the sake of simplicity.

Although not referred to in the foregoing description of any of the embodiments, to prevent erroneous recording, a recording medium into which image information or the like is being written is inhibited from being detached from the camera body.

Although in each of the first to third embodiments the vibration-shock detecting circuit 28 is provided in the camera body (camera side), it is also possible to adopt an arrangement in which the vibration-shock detecting circuit 28 is not provided on the camera side. Since the influence of a vibration or a shock is exerted on only the hard disk unit 12, the hard disk unit 12 may be provided with a vibration-shock detecting sensor or the like so that a detection result can be transmitted from the vibration-shock detecting sensor or the like to the camera side. In this arrangement, there is no need to dispose the vibration-shock detecting circuit 28 on the camera side.

In each of the fourth to seventh embodiments, the camera body is provided with the temperature detecting circuit 57 for detecting the temperature of a recording medium. However, since only the hard disk unit 12 undergoes the influence of temperature, a temperature sensor or the like may be provided on the hard disk unit 12 so that the result of temperature detection can be transmitted to the camera body. In this case, it is not necessary to provide the temperature detecting circuit 57 in the camera body.

The foregoing description of the embodiments has been given for illustrative purposes only and not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. An information processing apparatus comprising:
    a) inputting means for inputting an information signal;
    b) compressing means for compressing the information signal inputted by said inputting means;
    c) connecting means for permitting connection of one of a plurality of recording media having different recording forms;
    d) identifying means for identifying the recording form of a recording medium connected to said connecting means; and
    e) controlling means for controlling a processing operation of said-compressing means in accordance with an output from said identifying means.

2. An information processing apparatus according to claim 1, wherein the information signal is a video signal obtained by converting a subject image into an electrical signal.

3. An information processing apparatus according to claim 1, wherein the information signal is an audio signal.

4. An apparatus according to claim 1, wherein said inputting means includes image pickup means for picking up an object image.

5. An apparatus according to claim 4, wherein said plurality of recording mediums include a magnetic recording medium and a semi-conductor recording medium.

6. An information processing apparatus comprising:
    a) inputting means for inputting an information signal;
    b) compressing means for compressing the information signal inputted by said inputting means;
    c) connecting means for permitting connection of a plurality of recording media having different recording forms;
    d) setting means for setting a compression method of said compressing means; and
    e) recording means for selecting a recording medium on which the compressed information signal is to be recorded from among the plurality of recording media connected to said connecting means, in accordance with an output from said setting means, and recording the information signal on the selected recording medium.

7. An information recording apparatus according to claim 6, wherein said recording means identifies the recording forms of the respective recording media connected to said connecting means before selecting the recording medium on which the information signal is to be recorded.

8. An information recording apparatus according to claim 6, wherein the information signal is a video signal obtained by converting a subject image into an electrical signal.

9. An information recording apparatus according to claim 6, wherein the information signal is an audio signal.

10. An apparatus according to claim 6, wherein said inputting means includes pick-up means for picking up an image of an object.

11. An apparatus according to claim 10, wherein said plurality of recording mediums include a magnetic recording medium and a semi-conductor recording medium.

12. An information recording apparatus attachable and detachable with a plurality of recording mediums having different recording modes, comprising:
    a) input means for inputting an information signal;
    b) selection means for selecting a desired recording medium from among the plurality of recording mediums;
    c) compression means for compressing the information signal inputted by the input means by using a compression mode set according to an output of the selection means; and
    d) recording means for recording the information signal compressed by the compression means on the recording medium selected by the selection means.

13. An apparatus according to claim 12, wherein said inputting means includes image pickup means for picking up an object image.

14. An apparatus according to claim 13, wherein said plurality of recording mediums include a magnetic recording medium and a semi-conductor recording medium.

15. A method for recording of an information recording apparatus attachable and detachable with a plurality of recording mediums having different recording modes, said method comprising steps of:
    a) inputting an information signal;
    b) selecting a desired recording medium from among said plurality of recording mediums;
    c) setting a compressing method according to the selected recording medium;
    d) compressing the inputted information signal using the set compressing method; and
    e) recording the compressed information signal on the selected recording medium.

16. A method according to claim 15, wherein said information signal is a picture image signal obtained by picking up an object image by pickup means.

17. A method according to claim 16, wherein said plurality of recording mediums include a magnetic recording medium and a sem-iconductor recording medium.

18. An information recording apparatus attachable and detachable with a plurality of recording mediums having different recording modes, comprising:
    a) input means for inputting an information signal;
    b) compression means for compressing the information signal;
    c) determination means for determining a recording medium attached on the apparatus; and
    d) control means for controlling compression processing of the compression means according to an output of the determination means.

19. An apparatus according to claim 18, wherein said plurality of recording mediums include a magnetic recording medium and a semi-conductor recording medium.

20. An apparatus according to claim 19, wherein said inputting means includes pickup-means for picking up an image of an object.

21. A method for recording of an information recording apparatus attachable and detachable with a plurality of recording mediums having different recording modes, comprising steps of:
- a) inputting an information signal;
- b) compressing the information signal;
- c) determining a recording medium attached on the apparatus; and
- d) controlling compression processing of the compression step according to a determination result.

22. A method according to claim 21, wherein the information signal is a picture image signal obtained by picking up an object image by pickup-up means.

23. A method according to claim 22, wherein said plurality of recording means include a magnetic recording medium and a semi-conductor recording medium.

* * * * *

UNITED STATES PATENT AND TRADEMARK OFFICE
CERTIFICATE OF CORRECTION

PATENT NO.    : 6,157,773
DATED         : December 5, 2000
INVENTOR(S)   : Yoichi Yamagishi It is certified that error appears in the above-identified patent and that said Letters Patent is hereby corrected as shown below:

Column 4,
Line 3, delete "memory B" and insert -- memory 8 --.

Column 30,
Line 47, delete "semi-iconductor -- and insert -- semi-conductor --.

Signed and Sealed this

Second Day of April, 2002

Attest:

JAMES E. ROGAN
Attesting Officer    Director of the United States Patent and Trademark Office